United States Patent
Muthuchamy et al.

(10) Patent No.: US 11,889,303 B2
(45) Date of Patent: Jan. 30, 2024

(54) 5G N1/N2 INTERFACE MONITORING SYSTEM

(71) Applicant: NetScout Systems, Inc., Westford, MA (US)

(72) Inventors: Subappriya Muthuchamy, Fremont, CA (US); Sandeep Prasad, Pleasanton, CA (US); Tauras Liubinskas, Lexington, KY (US); Abhishek Saraswati, Santa Clara, CA (US); Alessandro Pinelli, Pune (IT); Pritish Vijay Aherrao, Maharashtra (IN); Loreto Di Resta, Modena (IT); Brandon Bass, Flower Mound, TX (US)

(73) Assignee: Netscout Systems, Inc., Westford, MA (US)

(*) Notice: Subject to any disclaimer, the term of this patent is extended or adjusted under 35 U.S.C. 154(b) by 386 days.

(21) Appl. No.: 17/409,202

(22) Filed: Aug. 23, 2021

(65) Prior Publication Data
US 2023/0007473 A1    Jan. 5, 2023

(30) Foreign Application Priority Data
Jun. 30, 2021  (IN) .............................. 202141029404

(51) Int. Cl.
*H04W 12/06*    (2021.01)
*H04W 12/04*    (2021.01)
*H04W 12/03*    (2021.01)

(52) U.S. Cl.
CPC ........... *H04W 12/04* (2013.01); *H04W 12/03* (2021.01)

(58) Field of Classification Search
CPC .................................................. H04W 12/04
See application file for complete search history.

(56) References Cited

U.S. PATENT DOCUMENTS 10,582,371 B1 *  3/2020  Abraham ................ H04W 8/06
10,764,742 B1 *  9/2020  Abraham .............. H04W 12/72
(Continued)

FOREIGN PATENT DOCUMENTS

CN     112291724     1/2021
CN     112822674     5/2021
(Continued)

OTHER PUBLICATIONS

PCT International Search Report and Written Opinion dated Oct. 5, 2022 in International Application No. PCT/US2022/035301.

*Primary Examiner* — Moustapha Diaby
(74) *Attorney, Agent, or Firm* — Foley & Lardner LLP

(57) ABSTRACT

An illustrative embodiment disclosed herein is a non-transitory computer readable medium. The medium includes instructions for providing a mobile user monitoring solution that, when executed by a processor, cause the processor to identify a user database record associated with a user equipment (UE) using a mobile identity (ID), associate a Next Generation application protocol (NGAP) session with the user database record using an NGAP ID, capture a ciphered message associated with the NGAP session, decipher the ciphered message associated with the NGAP session, extract, from the deciphered message, session details associated with the UE, and store the session details in a session detail record.

20 Claims, 17 Drawing Sheets

(56) References Cited

U.S. PATENT DOCUMENTS

2012/0159151 A1\* 6/2012 Janakiraman ....... H04W 12/041
713/153
2016/0269900 A1\* 9/2016 Goldfarb ............. H04W 12/069
2021/0400473 A1\* 12/2021 Tiwari .............. H04W 12/0431

FOREIGN PATENT DOCUMENTS

EP 3393101 A1 10/2018
WO WO-2021/013225 A1 1/2021

\* cited by examiner

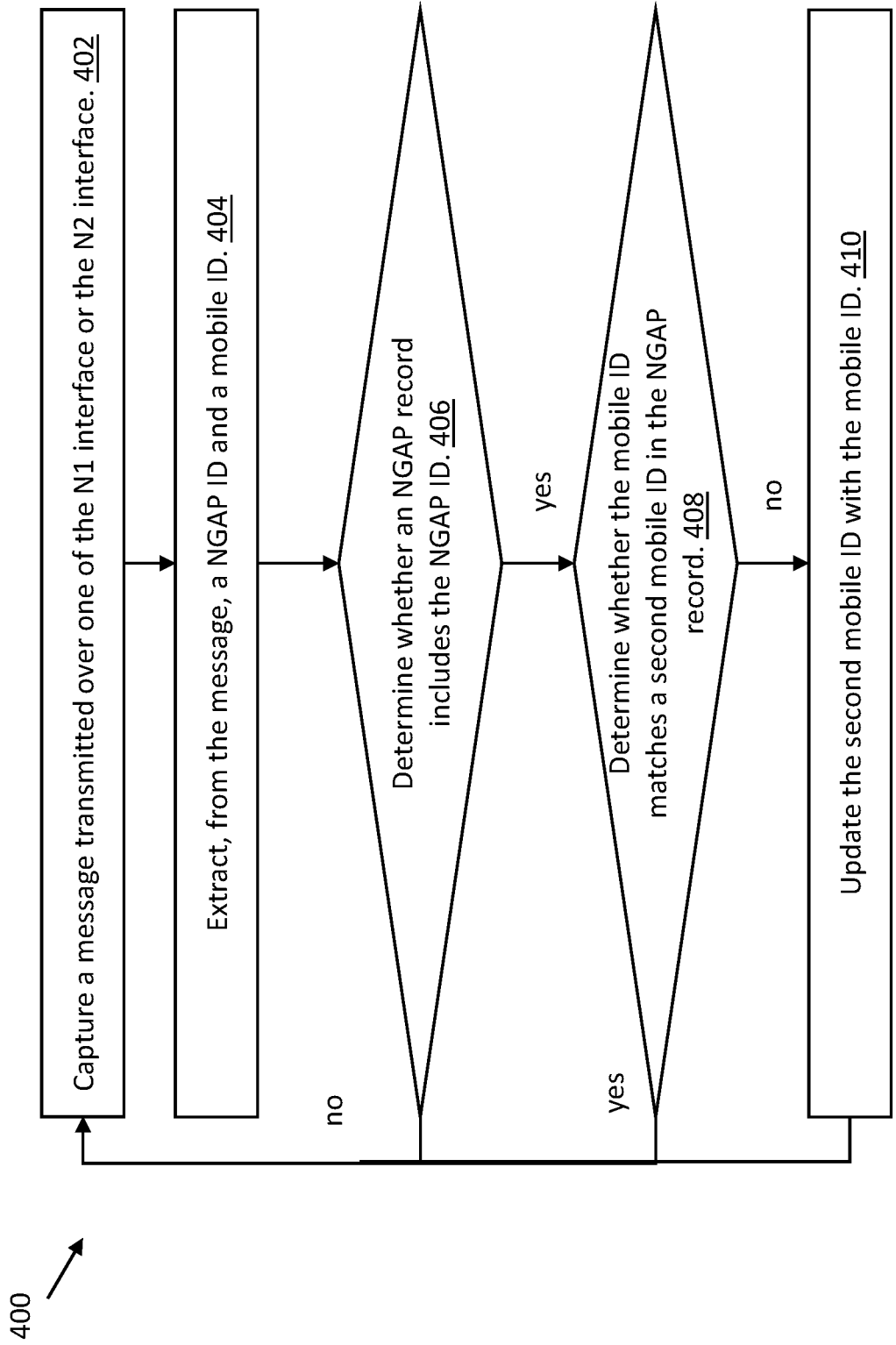

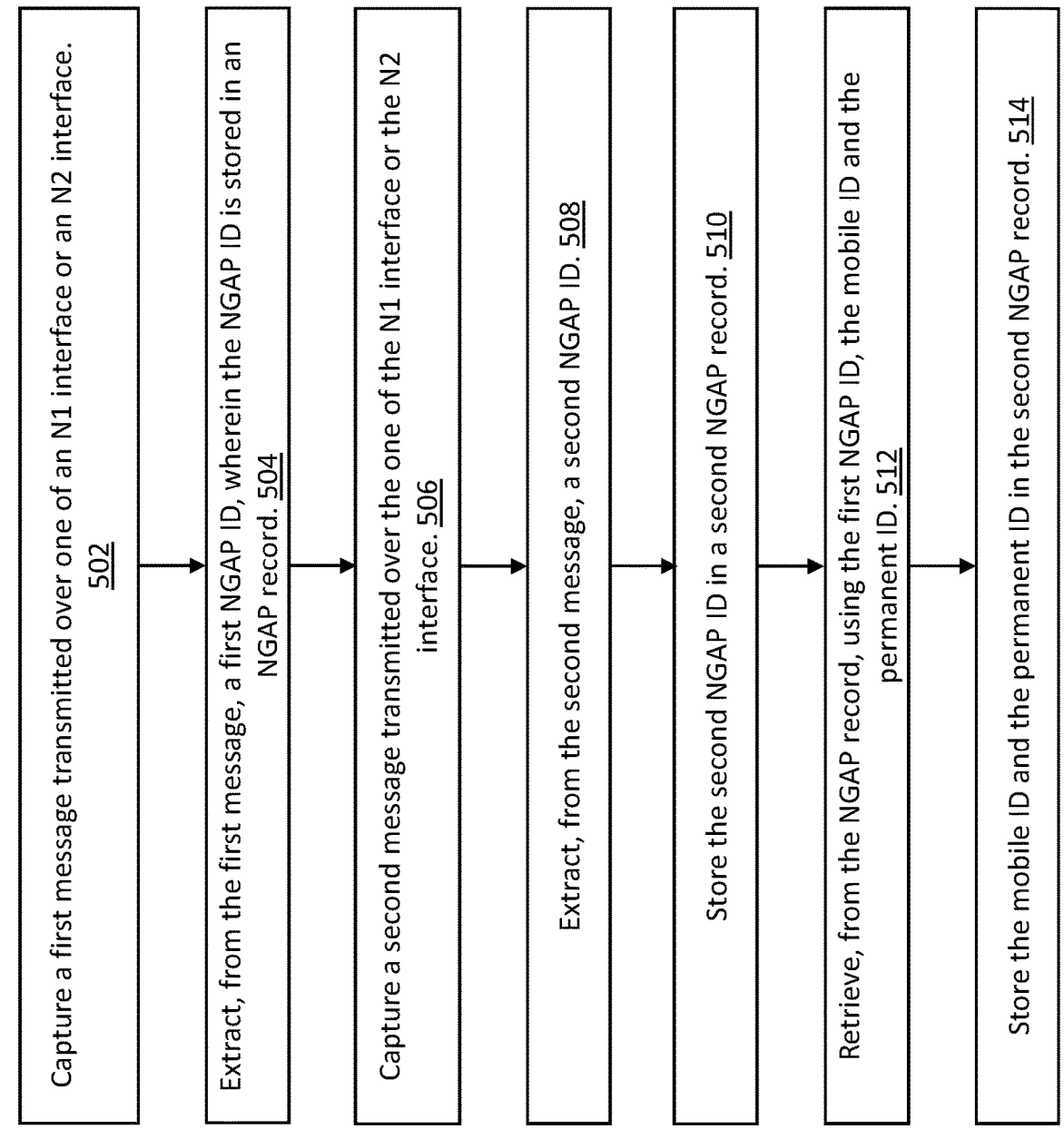

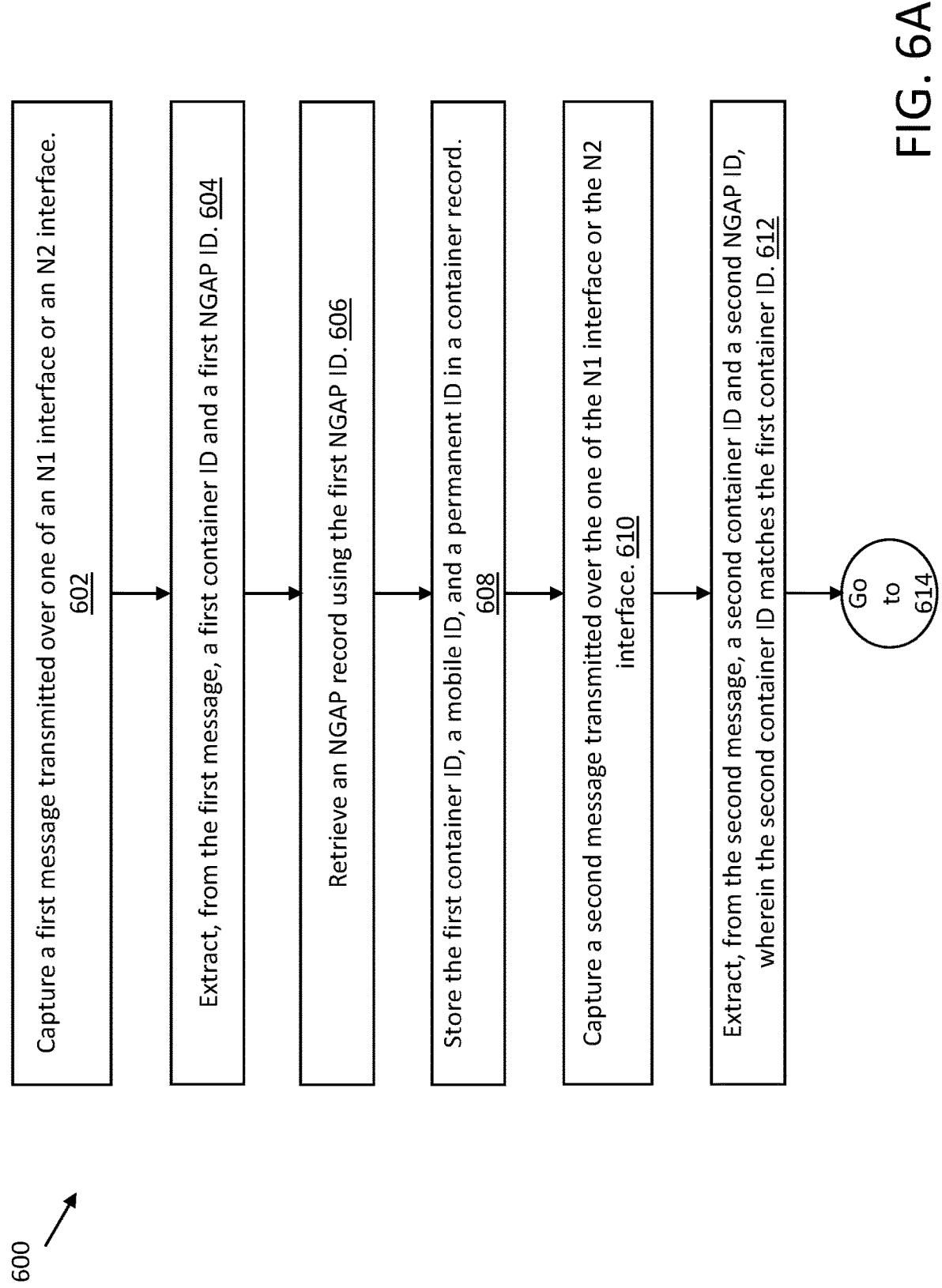

5G N1/N2 INTERFACE MONITORING SYSTEM

CROSS-REFERENCE TO RELATED APPLICATION

This application is related to and claims priority under 35 U.S. § 119(b) the Indian Patent Application No. 202141029404, filed Jun. 30, 2021, titled "5G N1/N2 INTERFACE MONITORING SYSTEM," the entire contents of which are incorporated herein by reference for all purposes.

BACKGROUND

The 5G Core aggregates data traffic from end devices. The 5G Core also authenticates subscribers and devices, applies personalized policies and manages the mobility of the devices before routing the traffic to operator services or the Internet. The 5G Core and its predecessor, the Evolved Core Packet (EPC), are different in that the 5G Core is decomposed into a number of Service-Based Architecture (SBA) elements and is designed from the ground-up for complete control and user plane separation. Rather than physical network elements, the 5G Core comprises software-based network functions.

SUMMARY

Aspects of the present disclosure relate generally to a 5G network, and more particularly to a system, apparatus, and method for monitoring N1 and N2 interfaces.

An illustrative embodiment disclosed herein is a non-transitory computer readable medium. The medium includes instructions for providing a mobile user monitoring solution that, when executed by a processor, cause the processor to identify a user database record associated with a user equipment (UE) using a mobile identity (ID), associate a Next Generation application protocol (NGAP) session with the user database record using an NGAP ID, capture a ciphered message associated with the NGAP session, decipher the ciphered message associated with the NGAP session, extract, from the deciphered message, session details associated with the UE, and store the session details in a session detail record.

In some aspects, the user database record includes a permanent ID, the mobile ID includes one of a temporary mobile subscriber identity (TMSI), a shorten (S)-TMSI, a 5G-S-TMSI, a globally unique temporary ID (GUTI), or a 5G-GUTI, the permanent ID includes a subscription permanent identity (SUPI), and the SUPI contains one of an international mobile subscriber identity (IMSI) or a network access identifier (NAI).

In some aspects, the medium includes instructions that, when executed by a processor, further cause the processor to identify the user database record by capturing a first message transmitted over one of an N1 interface and an N2 interface, extracting the mobile ID from the first message, and identifying the user database record using the mobile ID.

In some aspects, the medium includes instructions that, when executed by a processor, further cause the processor to decipher the ciphered message associated with the NGAP session by retrieving, from the user database record, a cipher key using the mobile ID, and deciphering, using the cipher key, the ciphered message associated with the NGAP session.

In some aspects, the medium includes instructions that, when executed by a processor, further cause the processor to associate the NGAP session with the user database record by capturing a first message transmitted over one of an N1 interface or an N2 interface, extracting, from the first message, one of the NGAP ID, an expected response (XRES), or an authentication token (AUTN), and associating the NGAP session with the user database record using the one of the NGAP ID, the XRES, or the AUTN.

In some aspects, the medium includes instructions that, when executed by a processor, further cause the processor to associate the NGAP session with the user database record by capturing a second message transmitted over an N12 interface, extracting, from the second message, one of the XRES or the AUTN, a permanent ID, and a cipher key, storing the one of the XRES or the AUTN and the permanent ID in an XRES record, storing the permanent ID and the cipher key in the user database record; extracting, from the first message, the one of the XRES or the AUTN, retrieving the permanent ID from the XRES record using the one of the XRES or the AUTN, and retrieving the cipher key from the user database record using the permanent ID.

In some aspects, the medium includes instructions that, when executed by a processor, further cause the processor to capture a first message transmitted over an N2 interface; extract, from the first message, the NGAP ID and a second mobile ID, retrieve the mobile ID from an NGAP record using the NGAP ID, retrieve the user database record using the mobile ID, and update the mobile ID with the second mobile ID.

In some aspects, the medium includes instructions that, when executed by a processor, further cause the processor to capture a first message transmitted over one of an N1 interface or an N2 interface, extract, from the first message, the NGAP ID, wherein the NGAP ID is stored in an NGAP record, capture a second message transmitted over the one of the N1 interface or the N2 interface, extract, from the second message, a second NGAP ID, store the second NGAP ID in a second NGAP record, retrieve, from the NGAP record, using the NGAP ID, the mobile ID and a permanent ID, and store the mobile ID and the permanent ID in the second NGAP record.

In some aspects, the medium includes instructions that, when executed by a processor, further cause the processor to capture a first message transmitted over an N1 interface or an N2 interface, extract, from the first message, a first container ID and the NGAP ID, retrieve an NGAP record using the NGAP ID, store the first container ID, the mobile ID, and a permanent ID in a container record, capture a second message transmitted over the one of the N1 interface or the N2 interface, extract, from the second message, a second container ID and a second NGAP ID, store the second NGAP ID in a second NGAP record, retrieve, from the container record, using the second container ID, the mobile ID and the permanent ID, and store the mobile ID and the permanent ID in the second NGAP record. In some embodiments, the second container ID matches the first container ID.

In some aspects, the medium includes instructions that, when executed by a processor, further cause the processor to capture a first message transmitted over an N14 interface, extract, from the first message, a first container ID, a permanent ID, and a cipher key, store the permanent ID and the cipher key in the user database record, store the first container ID and the permanent ID in a container record, capture a second message transmitted over one of an N1 interface or an N2 interface, extract, from the second message, a second container ID and the NGAP ID, store the NGAP ID in the NGAP record, retrieve, from the container record, using the second container ID, the permanent ID, retrieve, from the user database record, using the permanent ID, the cipher key, and store the permanent ID and the cipher key in the NGAP record. In some embodiments, wherein the second container ID matches the first container ID.

In some aspects, the medium includes instructions that, when executed by a processor, further cause the processor to capture a first message transmitted over one of an N1 interface or an N2 interface, extract, from the first message, the mobile ID, capture a pair of messages transmitted over an N14 interface, extract, from the pair of messages, a second mobile ID matching the mobile ID, a permanent ID, and a cipher key, retrieve the user database record using the permanent ID, update, in the user database record, a previous mobile ID and a previous cipher key with the mobile ID and the cipher key, respectively and retrieve the updated user database record using the mobile ID.

In some aspects, the medium includes instructions that, when executed by a processor, further cause the processor to capture a first message transmitted over one of an N1 interface and an N2 interface, extract, from the first message, a first 5G mobile ID, capture a second message transmitted over an N26 interface, extract, from the second message, a 4G mobile ID, a permanent ID, and a cipher key, convert the 4G mobile ID to a second 5G mobile ID matching the first 5G mobile ID, retrieve the user database record using the permanent ID, update, in the user database record, the 4G mobile ID and a previous cipher key with the second 5G mobile ID and the cipher key, respectively, and retrieve the updated user database record using the first 5G mobile ID.

In some aspects, the session details include two or more of location information, a handset type, local network information, service quality information, or other user statistics.

Another illustrative embodiment disclosed herein is an apparatus. In some aspects, the apparatus includes a processor and a memory. In some embodiments, the memory includes programmed instructions that, when executed by the processor, cause the apparatus to identify a user database record associated with a user equipment (UE) using a mobile identity (ID), associate a Next Generation application protocol (NGAP) session with the user database record using an NGAP ID, capture a ciphered message associated with the NGAP session, decipher the ciphered message associated with the NGAP session, extract, from the deciphered message, session details associated with the UE, and store the session details in a session detail record.

In some aspects, the memory includes programmed instructions that, when executed by a processor, further cause the apparatus to identify the user database record by: capturing a first message transmitted over one of an N1 interface and an N2 interface, extracting the mobile ID from the first message, and identifying the user database record using the mobile ID.

In some aspects, the memory includes programmed instructions that, when executed by a processor, further cause the apparatus to associate the NGAP session with the user database record by: capturing a first message transmitted over one of an N1 interface or an N2 interface, extracting, from the first message, one of the NGAP ID, an expected response (XRES), or an authentication token (AUTN), and associating the NGAP session with the user database record using the one of the NGAP ID, the XRES, or the AUTN.

An illustrative embodiment disclosed herein is a method. In some aspects, the method includes identifying a user database record associated with a user equipment (UE) using a mobile identity (ID), associating a Next Generation application protocol (NGAP) session with the user database record using an NGAP ID, capturing a ciphered message associated with the NGAP session, deciphering the ciphered message associated with the NGAP session, extracting, from the deciphered message, session details associated with the UE, and storing the session details in a session detail record.

In some aspects, identifying the user database record further comprises capturing a first message transmitted over one of an N1 interface and an N2 interface, extracting the mobile ID from the first message, and identifying the user database record using the mobile ID.

In some aspects, associating the NGAP session with the user database record further comprises capturing a first message transmitted over one of an N1 interface or an N2 interface, extracting, from the first message, one of the NGAP ID, an expected response (XRES), or an authentication token (AUTN), and associating the NGAP session with the user database record using the one of the NGAP ID, the XRES, or the AUTN.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 is a flow chart of an example method for tracking a mobile ID change, in accordance with some embodiments.

FIG. 5 is a flow chart of an example method for tracking a user during an Xn handover, in accordance with some embodiments.

FIGS. 6A-6B are a flow chart of an example method for tracking a user during an N2 handover without an AMF change, in accordance with some embodiments.

Figure 1:
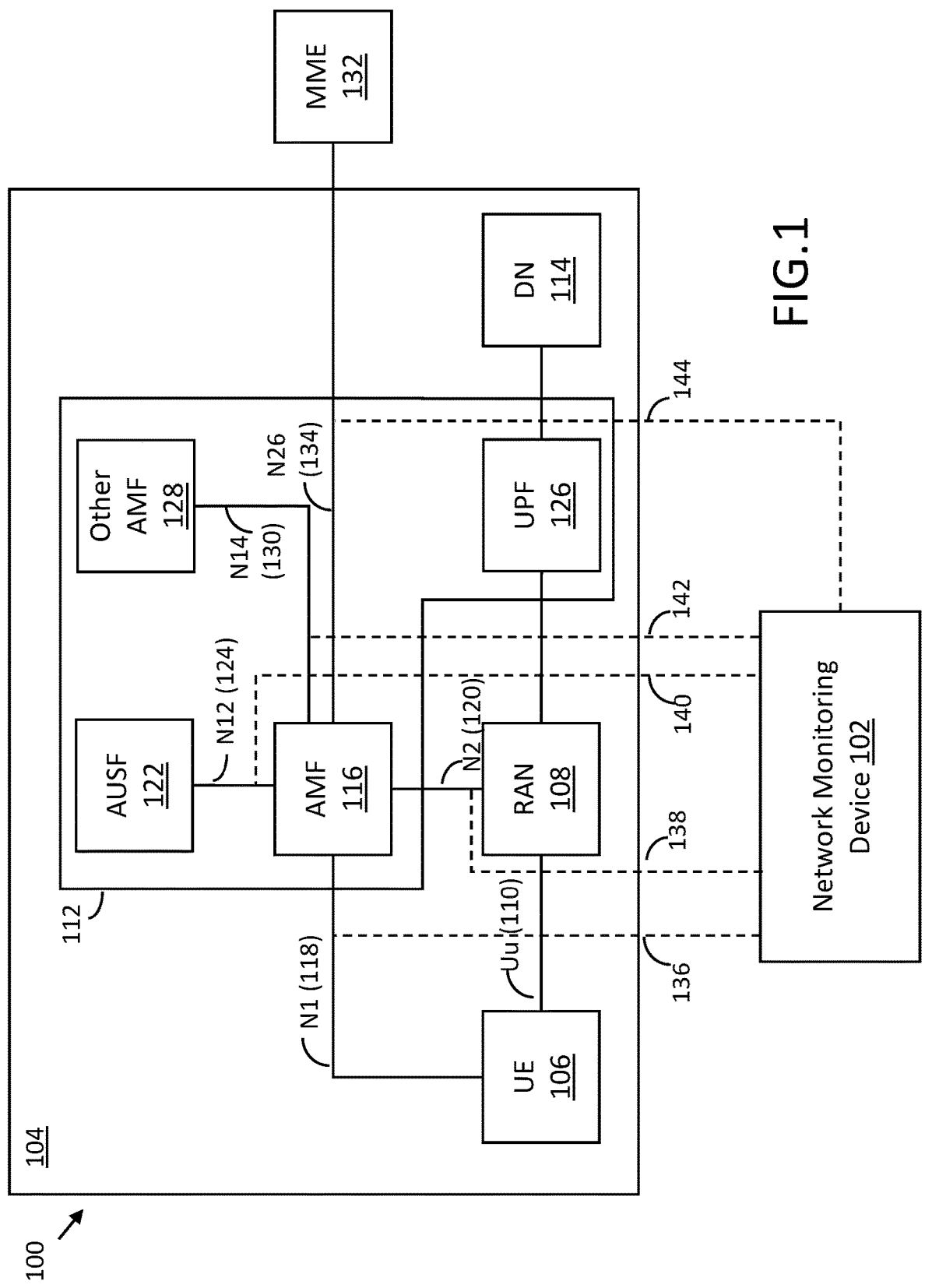
FIG. 1 is a block diagram of an environment for monitoring a 5G network, in accordance with some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Monitoring an N1/N2 interface may include obtaining cipher keys for deciphering the user's messages as well as establishing mappings between user identities and a session in which the user transmits messages. There are various technical challenges to obtaining the mappings and obtaining the cipher keys when monitoring the N1 interface (a 5G interface between the user and a core network, which is also known as the non-access stratum (NAS)) and the N2 interface (a 5G interface between a radio access network and the core network). In some embodiments, the temporary and concealed user identities are used across the N1/N2 interface (e.g., when going from idle state to active state), and the permanent identity is to be resolved when using other interfaces in the network. In addition, when users move to a different cell site, there are different types of handovers that are to be handled to track the user. Moreover, cipher keys are passed through other interfaces (e.g., N12, N14, and N26).

Disclosed herein is a system, apparatus, and method that can address the technical challenges by monitoring multiple interfaces and mapping various identities and keys to enable users to be tracked and NAS messages to be deciphered, even during handovers. For instance, in some embodiments, the disclosed system, apparatus, and method store parameters of a Next Generation application protocol (NGAP) session in an NGAP record and associate the NGAP record with a user database record that tracks the various IDs of the user and the security context. In some embodiments, when a handover results in a second NGAP session, the disclosed system, apparatus, and method store parameters of the second NGAP session in a second NGAP record that is associated with the user database record. In some embodiments, the disclosed system, apparatus, and method capture messages associated with the NGAP session. In some embodiments, the disclosed system, apparatus, and method decipher any of the captured messages that are ciphered using one or more cipher keys retrieved from the user database record. In some embodiments, the disclosed system, apparatus, and method store user equipment session details associated with the user, such as a handset type and location information, in a session detail record that is mapped to the user database record.

In some embodiments, the disclosure herein provides a comprehensive solution to decrypt the NAS layer in the protocol stack of the Next Generation mobile technology (5G). In some embodiments, the disclosure herein provides a centralized database for tracking any of the identities and cipher keys in real-time (or substantially real-time). In some embodiments, by decrypting the NAS layer in real-time, and by providing a centralized database in read-access memory (RAM), the disclosure herein effectively monitors N1/N2 interface in real-time.

Referring now to FIG. 1, a block diagram of an environment 100 for monitoring a 5G network is depicted, in accordance with some embodiments. The environment 100 includes a network monitoring device (e.g., a probe) 102 coupled to a 5G (New Radio) network 104. The network monitoring device 102 captures traffic (e.g., messages, packets) transmitted on various interfaces of the 5G network 104, deciphers traffic, extracts user data from the traffic, self-correlates user data, and correlates user data to subsequent traffic transmitted by the user over various interfaces.

The 5G network 104 includes user equipment (UE) 106 such as a mobile device, a phone, a smart phone, an Internet of Things (IoT) device, a vehicular communications device, a computer, a laptop, a tablet, a smart watch, or any 3GPP device associated with a user. The 5G network 104 includes a radio access network (RAN) 108 that is in communication with the UE 106 via a Uu (air, wireless, etc.) interface 110. The RAN 108 covers a geographical area which is divided into cell areas, with each cell area being served by a base station (e.g., a cell tower, a Next Generation nodeB (gNB), etc.).

The 5G network 104 includes a core network (CN, e.g., a 5G core network) 112, which provides access to one or more DNs such as the DN 114. The CN 112 includes a service-based architecture (SBA) in which messaging/signaling between network functions (NFs) are exposed via (e.g., happen on top of) hypertext transfer protocol (HTTP)/2 (e.g., HTTP or HTTP2) representational state transfer (REST)-ful application program interface (API). Each of the components of the CN 112, and other components of the 5G network 104, can produce and/or consume NF services over the HTTP/2 transport. In some embodiments, container orchestrators (e.g., Docker Containers, Kubernetes) and microservices are employed in implementing the NFs. The CN 112 includes a user plane function (UPF) 126 that forwards messages from the RAN 108 to one or more data networks (DN) such as the DN 114 (e.g., the Internet, a Local Area Data Network, an Internet Protocol Multimedia Subsystem (IMS) network, etc.).

The CN 112 includes the access and mobility management function (AMF) 114, which manages access and of the UE 106. The AMF 116 is responsible for coordinating authentication and registering users to the network. The AMF 116 also manages mobility of the UE 106 when the UE 106 roams from one gNB to another for session continuity. The AMF 116 is in communication with the UE 106 via an N1 interface 118. The AMF 116 is in communication with the RAN 108 via an N2 interface 120. FIG. 1 shows the interfaces as logical interfaces. In particular, the N1 interface 106 is part of the non-access stratum (NAS) which is a highest functional layer in a protocol stack between the CN 112 and the UE 106. In some embodiments, a message sent over the N1 interface are referred to as a NAS protocol data unit (PDU). Although most of the logical interfaces are same as their physical counterparts, messages transmitted over the N1 interface are physically transmitted via the RAN 108. In some embodiments, at least one of the UE 106, the RAN 108, or the AMF 116 encapsulates (e.g., appends, adds) the N1 messages with additional information elements (IEs).

The CN 112 includes the authentication server function (AUSF) 122 in communication with the AMF 116 over an N12 interface 124. The AUSF 122 is a part of the authentication procedure for authenticating the UE 106. The AUSF 122 sends a challenge message to the UE 106. The AUSF 122 verifies the authentication, for example, by comparing a response of the challenge message by the UE 106 to an expected response.

The UE 106 registers and authenticates after the UE 106 transitions from an idle state. First, the UE 106 sends a registration (e.g., initial NAS, initial UE, registration request, initial setup) message to the AMF 116. The registration message can include IEs including IEs needed to establish security in the initial message when the UE 106 has no NAS security context. The registration message is not ciphered.

The registration message can include IEs for identifying the UE 106 or a user associated with the UE 106. The registration message can include one or more user identities (IDs, e.g., identifiers). In some embodiments, the one or more user IDs can include at least one of one or more mobile IDs or one or more permanent IDs. In some embodiments, the one or more mobile IDs include one or more temporary IDs. In some embodiments, the one or more temporary IDs includes one or more of a temporary mobile subscriber identity (TMSI), a shorten(S)-TMSI, a 5G-S-TMSI, a globally unique temporary ID (GUTI), or a 5G-GUTI. In some embodiments, the one or more mobile IDs include one or more concealed identities such as a subscription concealed ID (SUCI). In some embodiments, the SUCI includes a concealed permanent ID (e.g., SUPI), while in other embodiments such as in a null-scheme, the SUCI includes a non-concealed (revealed) permanent ID. Other messages transmitted over the N1 interface or the N2 interface (e.g., de-registration request, service request, identity response, etc.) may include one or more mobile IDs. In some embodiments, the one or more permanent IDs includes a subscription permanent identity (SUPI), an international mobile subscriber identity (IMSI), an international mobile equipment identity (IMEI), an IMEI software version (IMEISV), or a network access identity (NAI). In some embodiments, the SUPI includes one or more of the IMSI, the IMEI, the IMEISV, or the NAI.

In some embodiments, the RAN 108 allocates a RAN UE a Next Generation Application Protocol (NGAP) ID to be used for (e.g., associated with) an NGAP session between the UE 106 and the AMF 116. In some embodiments, the RAN 108 encapsulates the registration message (e.g., the NAS PDU) with the RAN UE NGAP ID and forwards the encapsulated message to the AMF 116. In some embodiments, the AMF 116 allocates an AMF UE NGAP ID to be used for the NGAP session. In some embodiments, in the registration message or a subsequent N1 message (e.g., a downlink NAS transport) from the AMF 116 to the UE 106, the AMF 116 includes the AMF UE NGAP ID. In some embodiments, an NGAP ID refers to the RAN UE NGAP ID, the AMF UE NGAP ID, a pair of the RAN UE NGAP ID and the AMF UE NGAP ID, or one or more of the RAN UE NGAP ID or the AMF UE NGAP ID along with one or more of the gNB internet protocol (IP) or the AMF IP.

In some embodiments, the CN 112 includes multiple AMFs. For instance, as shown in FIG. 1, the CN 112 includes another AMF 128. The user can be re-allocated from the AMF 116 to the other AMF 128 or vice-versa. The AMF 116 can send information for identifying the user (e.g., a mobile ID or a permanent ID), information identifying the user's session (e.g., an NGAP ID) or information for deciphering the user's messages (e.g., cipher keys) to, or receive such information from, the other AMF 128. The AMF 116 is in communication with the other AMF 128 via an N14 interface 130.

In some embodiments, the 5G network 104 is coupled to a 4G network. For instance, as shown in FIG. 1, the AMF 116 is coupled to a mobility management entity (MME) 132 that is part of a 4G network. Other than being the 4G counterpart, the MME 132 is similar to the AMF 116 except that it performs both of the session management and the authentication. The user can be re-allocated from the AMF 116 to the MME 132 or vice-versa. The AMF 116 can send information for identifying the user, information identifying the user's session, or information for deciphering the user's messages to, or receive such information from, the MME 132. The AMF 116 is in communication with the MME 132 via an N26 interface 134.

In some embodiments, a handover can occur. One type of handover is an Xn handover, which a handover over the Xn interface between different gNBs. In some embodiments, the UE 106 retains a same AMF 116 during the Xn handover. In some embodiments, during the Xn handover, an NGAP ID associated with the UE 106, or a portion therein, is updated or stored in a second NGAP record that tracks a new NGAP session due to the Xn handover. For example, a path switch request message includes the information elements (IEs) RAN UE NGAP ID and AMF UE NGAP ID and a path switch request acknowledge includes the IEs RAN UE NGAP ID and AMF UE NGAP ID. In some embodiments, the RAN UE NGAP in the path switch request acknowledge is different from the RAN UE NGAP in the path switch request and the AMF UE NGAP ID in the path switch request acknowledge is same as the AMF UE NGAP ID in the path switch request. In some embodiments, the opposite is true. In some embodiments, IDs and cipher keys of the UE 106 are stored in the second NGAP record.

Another type of handover is an N2 handover, which is a handover from one gNB to another gNB over the N2 interface. In some embodiments, the UE 106 retains a same AMF 116 during the N2 handover, while in other embodiments, the UE 106 changes from the AMF 116 to the other AMF 128 (or vice versa). In some embodiments, during an N2 handover (or during timer-based events), an NGAP ID associated with the UE 106 is updated or stored in a second NGAP record.

In some embodiments, during an N2 handover, a container ID is used to track NGAP IDs as a result of the N2 handover. For example, a first message (e.g., a handover required message) includes the container ID and a first NGAP ID of an NGAP session before the N2 handover, and a second message (e.g., a handover request message) in response to the first message includes the container ID and a second NGAP ID of an NGAP session after the N2 handover. Another type of handover is a 4G-5G handover. In some embodiments, during a 4G-5G handover, a 5G GUTI is transmitted along with a permanent ID on the N26 interface, wherein the 5G GUTI updates the previous 4G GUTI.

In some embodiments, if the AMF 116 is not able to find the security context locally or from a last visited AMF (e.g., an AMF from another CN), or if the integrity check fails, then the AMF 116 initiates an authentication procedure with the UE 106. During the authentication procedure, in some embodiments, the AUSF 122 sends authentication vectors (AVs) to the AMF 116. The AVs may include an authentication token (AUTN), an expected response (XRES), and one or more cipher keys (e.g., CK, $K_{amf}$, $K_{seaf}$, $K_{ausf}$) for deciphering ciphered messages. In some embodiments, the AUSF 122 sends permanent IDs such as a SUPI or an IMSI to the AMF 116. The AUSF 122 sends a challenge message to the UE 106 via the AMF 116. The UE 106 generates a response (RES) to the challenge message using a key derivation function (KDF) possessed by the UE 106. The UE 106 sends the RES to the AUSF 122 via the AMF 116. The AUSF 122 authenticates the UE 106 by comparing the RES to the XRES to determine if the RES and the XRES match. In some embodiments, the messages sent during the authentication procedure between the UE 106 and the AMF 116 (herein, the authentication messages or the N1 authentication messages) are not ciphered, while in other embodiments, the N1 authentication messages are ciphered. The N12 authentication messages are not ciphered.

In some embodiments, if the authentication is successful (e.g., XRES and the RES match), the AMF 116 sends the NAS Security Mode Command message, which is not ciphered, to the UE 106. In some embodiments, the UE 106 sends the NAS Security Mode Complete message to the AMF 116 in response to the NAS Security Mode Command message. The NAS Security Mode Complete is ciphered and integrity protected.

The network monitoring device 102 is connected to the 5G network 104 using various links. For example, the network monitoring device 102 is coupled to the N1 interface 118 via link 136, the N2 interface 120 via link 138, the N12 interface 124 via link 140, the N14 interface 130 via link 142, and the N26 interface 134 via link 144. In some embodiments, the network monitoring device 102 is coupled to other interfaces (e.g., the Uu interface 110) via other links. Each of the links can be passive or active and include software, firmware, and/or hardware components, such as taps, probes, or port mirrors that can be positioned in-line along communication links between various components of the 5G network 104. In the case of a physical site, each link can receive a copy of packets flowing over the respective interface from a tap in-line with an edge router located at the physical site, or from a switch port analyzer ("SPAN") port on the edge router.

Figure 2A:
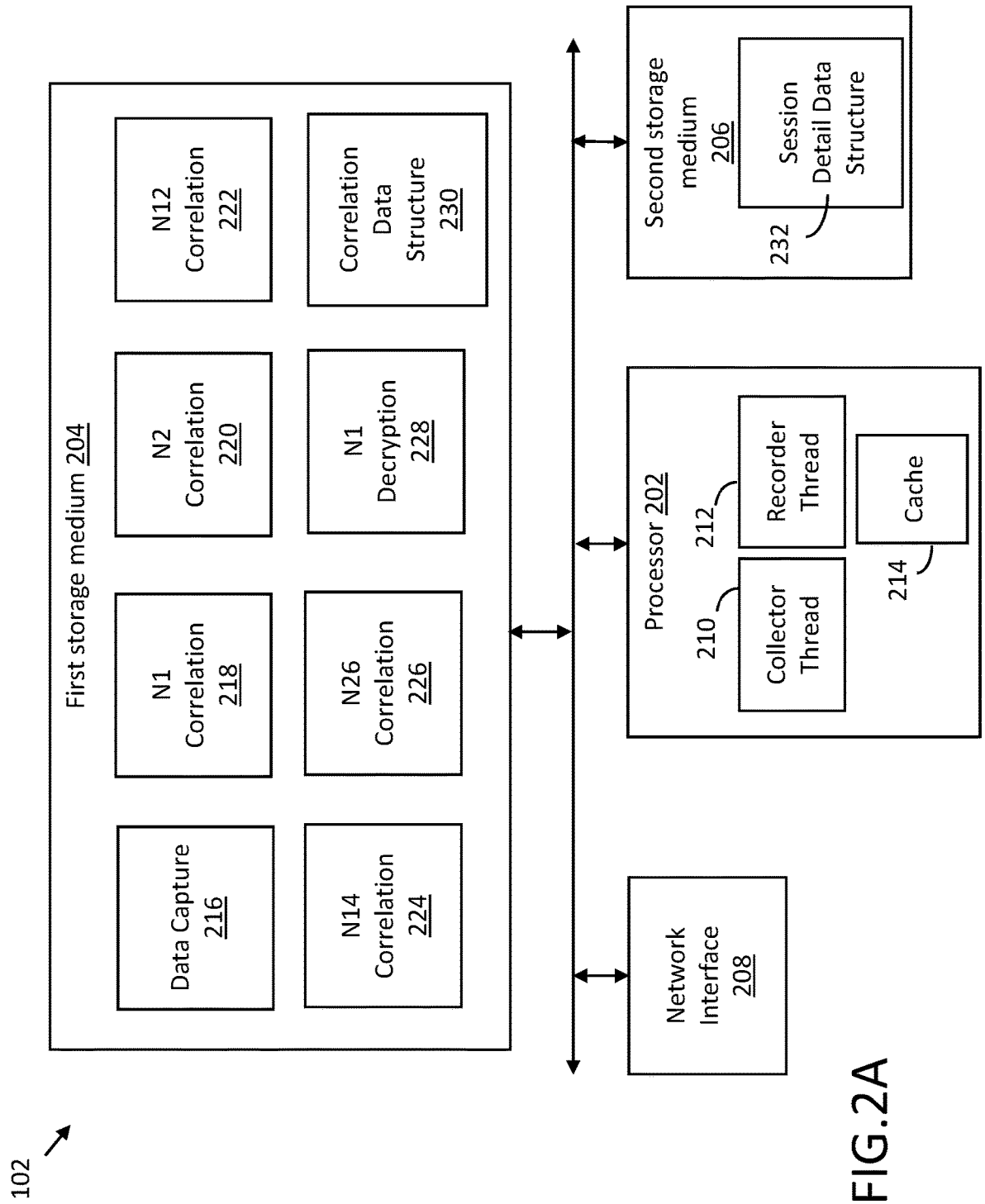
FIG. 2A is a block diagram of the network monitoring device, in accordance with some embodiments.

Referring now to FIG. 2A, a block diagram of the network monitoring device 102 is depicted, in accordance with some embodiments. The network monitoring device 102 includes a processor 202, a first storage medium 204, a second storage medium 206, and a network interface 208. The network monitoring device 102 may include other components such as input devices (e.g., keyboard, mouse) and output devices (e.g., display, monitor).

The processor 202 executes computer instructions stored in one or more of the first storage medium 204 or the second storage medium 206. Although only a single processor is shown in FIG. 2A, any number of processors is within the scope of the present disclosure. The processor 202 includes a cache 214. In some embodiments, user data extracted from captured traffic data can be stored in the cache 214.

The processor 202 includes one or more threads. For example, as shown in FIG. 2A, the processor includes a collector thread 210 and a recorder thread 212. In some embodiments, the collector thread 210 performs at least one of collecting user/session details/data/metadata (e.g., location information, a handset type, local network information, or service quality information) extracted from messages (e.g., N1 or N2 messages) transmitted over various (e.g., N1 or N2) interfaces, storing the session details in the cache 214 or the first storage medium 204, or aggregating statistics on the session details. In some embodiments, the recorder thread 212 stores, or copies, one or more of the messages or the session details to the second storage medium 206. Advantageously, by processing various messages in parallel in separate (e.g., dedicated) threads, the monitoring device 102 can achieve lower latency and live-time, or substantially live-time, monitoring of the 5G network 104. Although the processor 202 is shown as having one core and two threads, the processor 202 can have any number of cores and threads and remain within the scope of the present disclosure.

The first storage medium 204 stores instructions (e.g., computer instructions, programmed instructions) for one or more of processing, extracting, correlating, generating, storing, or retrieving traffic data (e.g., messages, packets, headers, payloads, fields, information elements, parameters, keys, credentials, etc.) or metadata derived from the traffic data. The first storage medium 204 is implemented in one of various devices (e.g., Random-Access Memory (RAM), static RAM (SRAM), dynamic RAM (DRAM), Resistive RAM (ReRAM), magnetoresistive RAM (MRAM)) that has a faster read or write speed than the second storage medium 206.

In some embodiments, the first storage medium 204 includes instructions for data capture 216, N1 correlation 218, N2 correlation 220, N12 correlation 222, N14 correlation 224, N26 correlation 226, and N1 decryption 228. In some embodiments, one or more of the instructions 216-228 can be combined. In some embodiments, the data capture 216 instructions include instructions to capture messages (e.g., control packets or data packets). In some embodiments, the data capture 216 instructions include instructions to extract user correlation/monitoring-related data (e.g., mobile IDs, permanent IDs, NGAP IDs, container IDs, security context (e.g., one or more cipher keys, a key set identifier, an uplink and downlink NAS count, etc.), time stamps, any parameters or state information related to mapping/correlating/linking users or NGAP sessions) from the captured messages. For example, the data capture 216 instructions include instructions to extract one or more of a permanent ID or security parameters such as XRES, AUTN, or security context from authentication messages transmitted over the N12 interface. In another example, the data capture 216 instructions include instructions to extract one or more of the session details associated with the user (e.g., handset type, etc.) from messages transmitted over one or more of the N1 interface or the N2 interface. The captured messages can also be captured on the N14 or N26 interface. The data capture 216 instructions can include instructions for software agents or virtual devices that remotely operate on, or control, each of the links (e.g., links 136, 138, 140, 142, and 144) and/or any associated hardware.

In some embodiments, the N1 correlation 218 instructions include instructions to correlate/map/link any user data extracted from messages captured over the N1 interface 118. For example, the N1 correlation 218 instructions include instructions to correlate a mobile ID to an NGAP ID. In some embodiments, correlating includes storing the first parameter in a first field of a record associated with a user (e.g., an NGAP record or a user database record) and storing the second parameter in a second field of the record associated with the user. This may be referred to as generating a mapping from the first parameter to the second parameter. For example, The N1 correlation 218 instructions include instructions to store (e.g., populate) the NGAP ID extracted from an N1 message in a first field of an NGAP record and to store a mobile ID extracted from an N1 message in a second field of an NGAP record. In some embodiments, each mapping may be a key-value pair in which the first parameter (e.g., the NGAP ID) is a key and the second parameter (e.g., the mobile ID) is the value. In some embodiments, the first parameter is an input to a hash function which generates or fetches (e.g., retrieves, accesses) the second parameter or a location/address of the second parameter.

The N1 correlation 218 instructions include instructions to store the mobile ID in a first field of a user database record and security context in a second field of a user database record. The N1 correlation 218 N1 correlation 218 instructions include instructions to use the NGAP ID extracted from an N1 message to retrieve the NGAP record that includes the matching NGAP ID and to retrieve the corresponding mobile ID. The N1 correlation 218 instructions include instructions to use the mobile ID extracted from an N1 message or retrieved from an NGAP record to retrieve a user database record that includes the matching mobile ID and to retrieve the corresponding permanent ID and/or security context. In some embodiments, the N1 correlation 218 instructions include instructions to update, or store in a new record, one or more of an NGAP ID, a mobile ID, permanent ID, or security context extracted from an N1 message (e.g., during an Xn handover, an N2 handover, a 4G-5G handover, or during a non-handover (e.g., upon expiration of a GUTI-related timer)).

In some embodiments, the N1 correlation 218 instructions include instructions to store session details such as handset type in a session detail data structure, which may be stored in a storage medium separate from the storage medium where the correlation data structure 230 is stored. In some embodiments, a session detail record in the separate session detail data structure can be linked to a respective user database record in the correlation data structure 230, for example, with an IMEI.

In some embodiments, the N2 correlation 220 instructions are similar to the N1 instructions except that the instructions relate to any user data extracted from messages captured over the N2 interface 120.

In some embodiments, the N12 correlation 222 instructions include instructions to correlate XRES extracted from messages captured over the N12 interface 124. In some embodiments, the N12 correlation 222 instructions include instructions to store an XRES in a first field of an XRES record and store a permanent ID in a second field of the XRES record. Similarly, in some embodiments, the N12 correlation 222 instructions include instructions to store a permanent ID in a first field of a user database record and store security context in a second field of the user database record.

In some embodiments, the N14 correlation 224 instructions are similar to the N12 instructions except that the instructions relate to any user data extracted from messages captured over the N14 interface 130. In some embodiments, the N26 correlation 226 instructions are similar to the N12 instructions except that the instructions relate to any user data extracted from messages captured over the N26 interface 134.

In some embodiments, the N1 decryption 228 instructions include instructions to decipher a ciphered N1 message (e.g., a ciphered N1 authentication message, a ciphered N1 security mode complete message, a subsequent N1 ciphered message) using a cipher key. In some embodiments, the N1 decryption 228 instructions include instructions to determine whether traffic data is ciphered. For example, security state information may be extracted from a message or a separate message that may indicate whether the message is ciphered. The N1 decryption 228 instructions may include instructions to decipher a message if the extracted security state information indicates that the message is ciphered.

The first storage medium 204 includes the correlation data structure 230, which stores the mappings in one or more data structures (e.g., databases, tables, files). For example, a first table stores NGAP records (e.g., mapping of NGAP ID-mobile ID pairs), a second table stores container records (e.g., mapping of container ID-mobile ID pairs), a third table stores XRES records (e.g., a mapping of XRES-permanent ID pairs), and a fourth table stores user database records (e.g., a mapping of temporary ID-permanent ID-security context tuples). More, less, or other mapping tables are within the scope of the present disclosure. Each table can include a number of records (e.g., rows, user database records). Each record may be associated with one UE (e.g., a first record is associated with the UE 106). In some embodiments, each record has a first field (e.g., entry) populated by the first parameter (e.g., an IE) of the mapping, or a hash thereof, and each of the one or more second fields populated by the second parameter/IE (e.g., one of the second parameters, if there is more than one) of the mapping, or a hash thereof. In some embodiments, the table is a hash table (e.g., a key-value table) in which the record containing the one or more second fields (e.g., the values, values in a bucket, etc.) is determined, fetched, or located based on transforming the first parameter by a hashing function (e.g., modulus of a predetermined number). In some embodiments, each record in a table has three or more fields.

The second storage medium 206 stores data or metadata that is the result of processing or correlating the traffic data. The second storage medium 206 is implemented in one of various devices (e.g., solid-state drive, hard disk drive, optical drive, etc.) that can store a greater amount of data than the first storage medium 204. In some embodiments, the second storage medium 206 is distributed across multiple such devices. In some embodiments, the second storage medium 206 stores the instructions for the data capture 216, the N12 correlation 222, the N1 correlation 218, and the N1 decryption 228, or instances thereof. In some embodiments, the processor 202 can execute each of the instructions 216, 218, 220, and 222 from the second storage medium 206. In some embodiments, the second storage medium 206 stores copies of the correlation data structures 230. In some embodiments, the second storage medium 206 includes the session detail data structure 232. The session detail data structure 232 includes session details (e.g., location information, a handset type, local network information, or service quality information) extracted from the captured messages.

In some embodiments, session details for each user are in a respective session detail record. In some embodiments, a user's session detail record persists even after the user has changed NGAP sessions (e.g., NGAP IDs). In some embodiments, the second storage medium 206 stores the captured messages, monitoring-related user parameters (e.g., a mobile ID, an NGAP ID) extracted from the captured messages, etc.

Figure 2B:
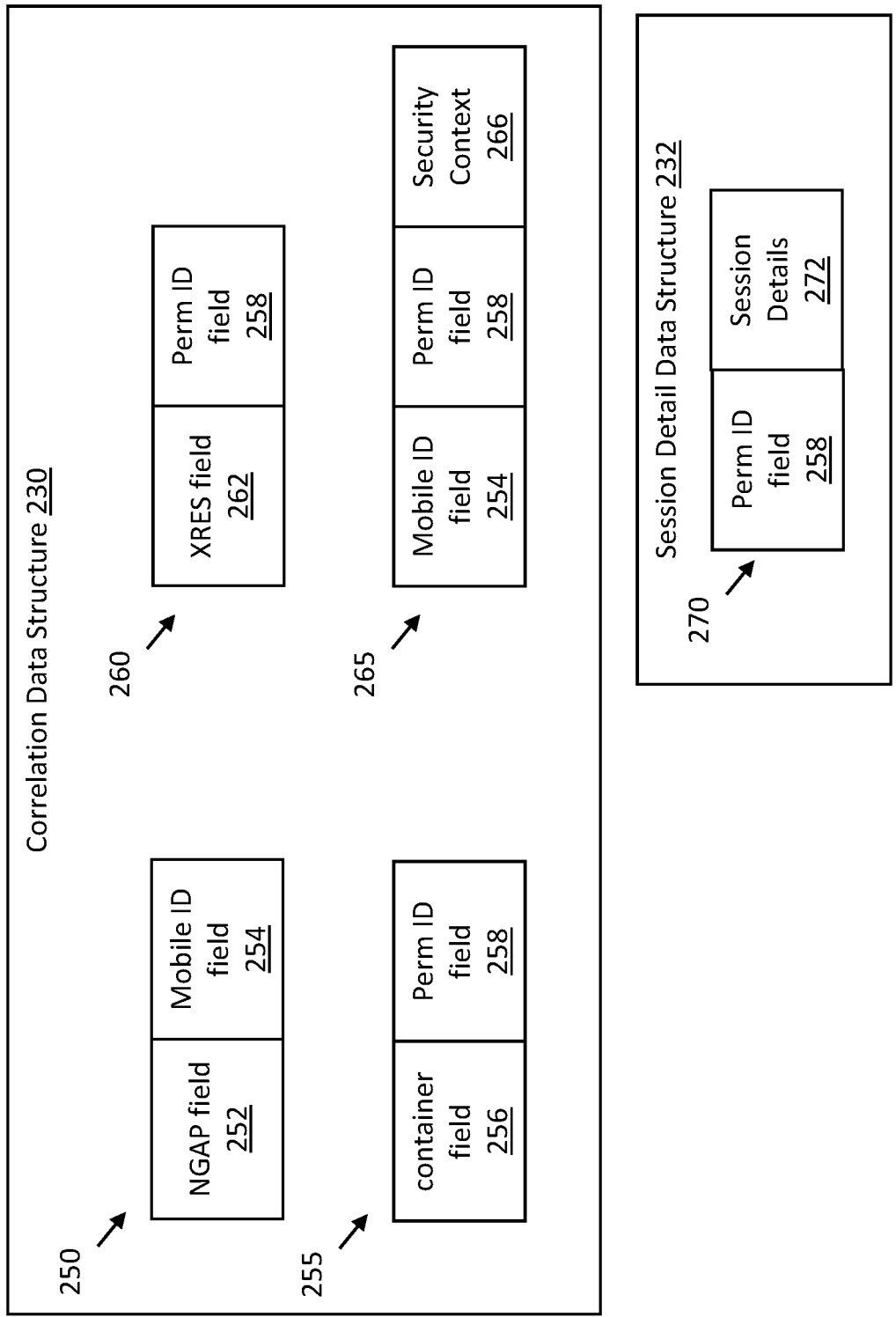
FIG. 2B is a block diagram of the correlation data structure, in accordance with some embodiments.

FIG. 2B illustrates records of one user that are in the correlation data structure 230 and the session detail data structure 232, in accordance with some embodiments of the present disclosure. In some embodiments, the correlation data structure 230 includes an NGAP record 250, a container record 255, an XRES record 260, a user database record 265. In some embodiments, the NGAP record 250 includes an NGAP field 252 and the mobile ID field 254, the container record 255 includes a container field 256 and a permanent ID field 258, the XRES record 260 includes an XRES field 262 and a permanent ID field 258, and the user database record 265 includes the mobile ID field 254, the permanent ID field 258, and a security context field 266. In some embodiments, the session detail data structure 232 includes a session detail record 270. In some embodiments, the session detail record 270 includes a permanent ID field 258 and a session details field 272. In some embodiments, the session details field 272 includes multiple fields (e.g., at least one for handset type, at least one for local network information, at least one for location information, at least one for service quality information, etc.).

Returning to FIG. 2A, the network interface 208 may include a NIC (network interface card) or other standard network interfaces to receive captured network traffic and communicate with other network interface devices. For example, the network interfaces 208 may include an N1 interface (e.g., the link 136), an N2 interface (e.g., the link 138), an N12 interface (e.g., the link 140), an N14 interface (e.g., the link 142), an N26 interface (e.g., the link 144), an 802.11 interface, an Ethernet interface, or other wired or wireless network interfaces.

Figure 3:
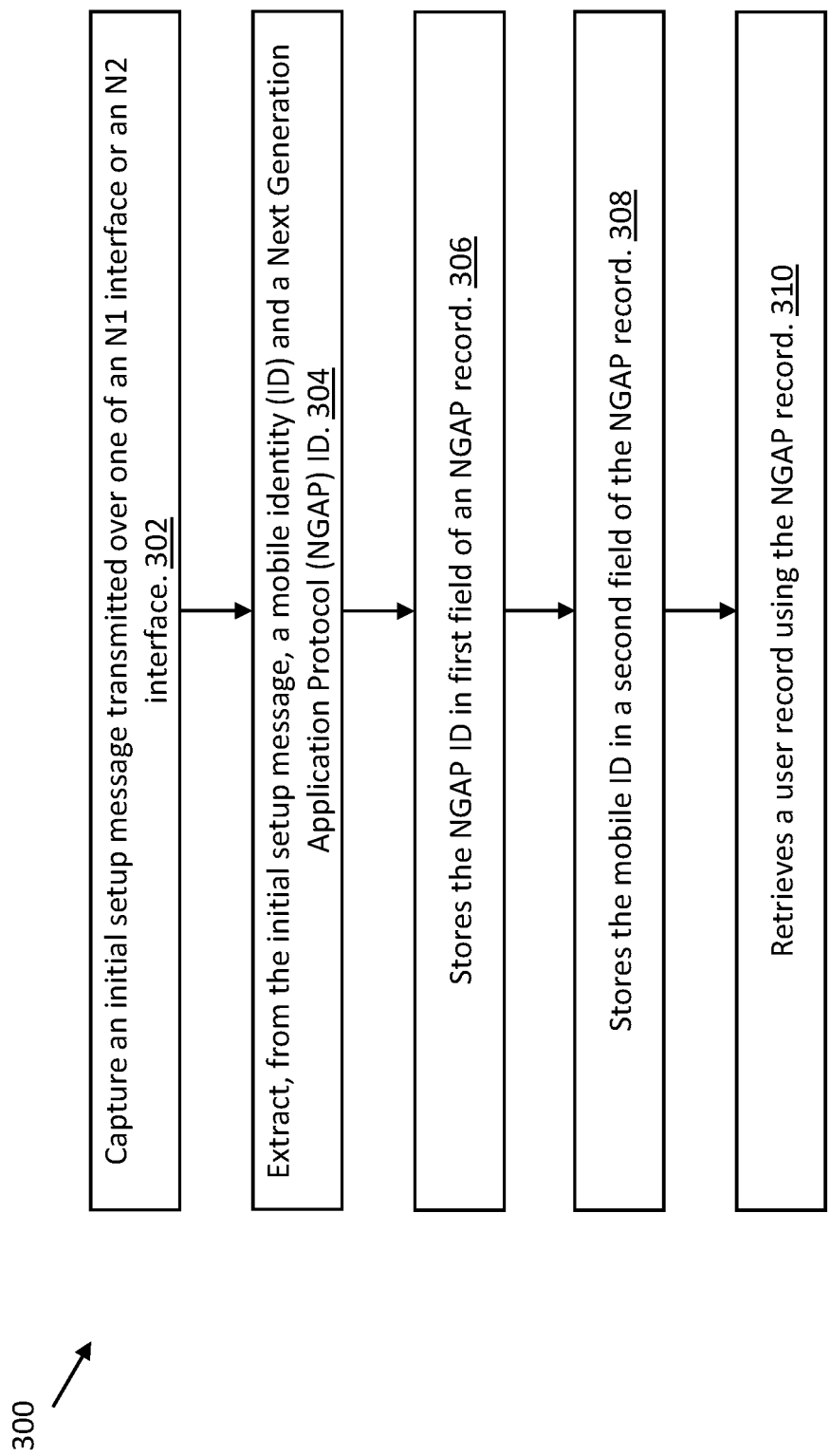
FIG. 3 is a flow chart of an example method for associating a user database record to a Next Generation Application Protocol (NGAP) session, in accordance with some embodiments.

Referring now to FIG. 3, a flow chart of an example method 300 for associating a user database record to a Next Generation application protocol (NGAP) session is depicted, in accordance with some embodiments. The method 300 can be performed by one or more systems, components, or modules depicted in FIG. 1 or 2, including, for example, a network monitoring device 102, the processor 202, etc. In some embodiments, instructions for performing the method 300 are stored in the first storage medium 204. Additional, fewer, or different operations may be performed in the method 300 depending on the embodiment. Additionally, or alternatively, two or more of the blocks of the method 300 may be performed in parallel.

The processor 202 captures an initial setup message transmitted over one of an N1 interface or an N2 interface (at operation 302). In some embodiments, the initial setup message is transmitted from the RAN 108 to the AMF 116. In some embodiments, the initial setup message includes (a) an NGAP ID associated with an NGAP session of the UE 106 and (b) a NAS PDU. In some embodiments, the NAS PDU is transmitted from the UE to the AMF 116 via the RAN 108, includes a mobile identity (ID) associated with the UE 106, and is encapsulated by the NGAP ID at the RAN 108. In some embodiments, the NAS PDU is in a payload portion of the initial setup message and the NGAP ID is in a header portion of the initial setup message. In some embodiments, the mobile ID is one of a SUCI, a 5G-GUTI, or a 5G-S-TSMI.

The processor 202 extracts, from the initial setup message, the mobile ID and the NGAP ID (at operation 304). The processor 202 stores (e.g., populates) the NGAP ID in a first field of an NGAP record (e.g., the NGAP record 250) (at operation 306). In some embodiments, the NGAP record is stored in the correlation data structure 230. In some embodiments, the correlation data structure resides in the first storage medium 204. The processor 202 stores the mobile ID in a second field of an NGAP record (at operation 308). The processor 202 retrieves a user database record (e.g., the user database record 265) using the NGAP record (at operation 310). In some embodiments, the user record includes a mobile ID matching the mobile ID stored in the NGAP record. In some embodiments, the user database record is retrieved from one or more of a correlation data structure 230 or a first storage medium 204. In some embodiments, operations 302-310 maps, or otherwise associates, the user database record to the NGAP session.

Referring now to FIG. 4, a flow chart of an example method 400 for tracking a mobile ID change, for example, when the AMF 116 reallocates a GUTI, is depicted, in accordance with some embodiments. The method 400 can be performed by one or more systems, components, or modules depicted in FIG. 1 or 2, including, for example, a network monitoring device 102, the processor 202, etc. In some embodiments, instructions for performing the method 400 are stored in the first storage medium 204. Additional, fewer, or different operations may be performed in the method 400 depending on the embodiment. Additionally, or alternatively, two or more of the blocks of the method 400 may be performed in parallel. Operations of the method 400 can be combined with or interchanged with operations of the method 300.

In some embodiments, the processor 202 captures a message transmitted over one of the N1 interface or the N2 interface (at operation 402). In some embodiments, the processor 202 extracts, from the message, an NGAP ID and a mobile ID (at operation 404). In some embodiments, the mobile ID is a SUCI, a 5G-GUTI, or a 5G-S-TSMI. In some embodiments, the mobile ID is a new mobile ID allocated by the AMF, e.g., based on a timer elapsing.

In some embodiments, the processor 202 determines whether an NGAP record (e.g., the NGAP record 250) includes the NGAP ID (at operation 406). In response to determining that the NGAP record includes the NGAP ID, in some embodiments, the processor 202 determines whether the mobile ID matches a second mobile ID in the NGAP record (at operation 408). In response to determining that the mobile ID does not match the second mobile ID in the NGAP record, the processor 202 updates the second mobile ID with the mobile ID (at operation 410). In some embodiments, the processor 202 updates (e.g., overwrites) the second mobile ID with the mobile ID in the NGAP record and in a user database record including the second mobile ID.

In some embodiments, in response to determining that the NGAP record (e.g., any of the NGAP records) does not include the NGAP ID, the processor 202 stores the NGAP ID and the mobile ID in a new NGAP record and the processor 202 returns to operation 402. In some embodiments, in response to determining that the mobile ID matches a second mobile ID in the NGAP record, or in response to updating the second mobile ID with the mobile ID, the processor 202 returns to operation 402.

Referring now to FIG. 5, a flow chart of an example method 500 for tracking a user during an Xn handover in which the AMF 116 is retained, is depicted, in accordance with some embodiments. The method 500 can be performed by one or more systems, components, or modules depicted in FIG. 1 or 2, including, for example, a network monitoring device 102, the processor 202, etc. In some embodiments, instructions for performing the method 500 are stored in the first storage medium 204. Additional, fewer, or different operations may be performed in the method 500 depending on the embodiment. Additionally, or alternatively, two or more of the blocks of the method 500 may be performed in parallel. Operations of the method 500 can be combined with or interchanged with operations of one or more of the method 300 or the method 400.

The processor 202 captures a first message transmitted over one of an N1 interface and an N2 interface (at operation 502). In some embodiments, the first message is a path switch request transmitted in response to the UE 106 moving to another cell (and in communication with another gNB) while retaining the same AMF 116. In some embodiments, the path switch request indicates a handover. The processor 202 extracts, from the first message a first NGAP ID (at operation 504). In some embodiments, the first NGAP ID is stored in an NGAP record. In some embodiments, the first message includes a AMF UE NGAP ID and a first RAN UE NGAP ID. In some embodiments, the processor 202 uses HTTP/2 processing to extract one or more NGAP IDs from the N14 interface. The HTTP/2 processing may include socket processing, fragment processing, stream processing, header inflation processing, synthetic packet creation, and/or Javascript object notation (JSON) processing for user identity and keys.

The processor 202 captures a second message transmitted over the one of the N1 interface and the N2 interface (at operation 506). In some embodiments, the second message is a path switch request acknowledge transmitted in response to the path switch request. The processor 202 extracts, from the second message, a second NGAP ID (at operation 508). In some embodiments, the second message includes the AMF UE NGAP ID and a second RAN UE NGAP ID. In some embodiments, the processor 202 determines that the second message is in response to the first message because the processor 202 determines that the AMF UE NGAP ID in the first message matches (e.g., is same as) the AMF UE NGAP ID in the second message. In some embodiments, the processor 202 matches two IDs (such as the AMF UE NGAP ID in the first message and the AMF UE NGAP ID in the second message) by comparing each alphanumeric character/value (and its position) in the first ID and the second ID and determines that each of the corresponding alphanumeric characters match in the first ID and the second ID.

The processor 202 stores the second NGAP ID in a second NGAP record (e.g., another record in the same data structure as the NGAP record 250) (at operation 510). The processor 202 retrieves, from the NGAP record 250, using the first NGAP ID, a mobile ID and a permanent ID (at operation 512). In some embodiments, the processor 202 also retrieves cipher keys from the NGAP record 250. In some embodiments, the processor 202 retrieves the NGAP record 250 using one of the AMF UE NGAP ID or the first RAN UE NGAP ID. The processor 202 stores the mobile ID and the permanent ID in the second NGAP record (at operation 514). In some embodiments, the processor 202 stores the cipher keys in the second NGAP record. In some embodiments, after the method 500 is completed, there are at least two NGAP records associated with the UE 106 (e.g., one for each NGAP session).

In some embodiments, the processor 202 stores the mobile ID, the permanent ID, and the cipher keys in a user database record 265. In some embodiments, the processor 202 updates, in the user database record 265, a previous mobile ID with the mobile ID. In some embodiments, the processor 202 updates, in the user database record 265, previous cipher keys with the cipher keys.

Figure 6B:
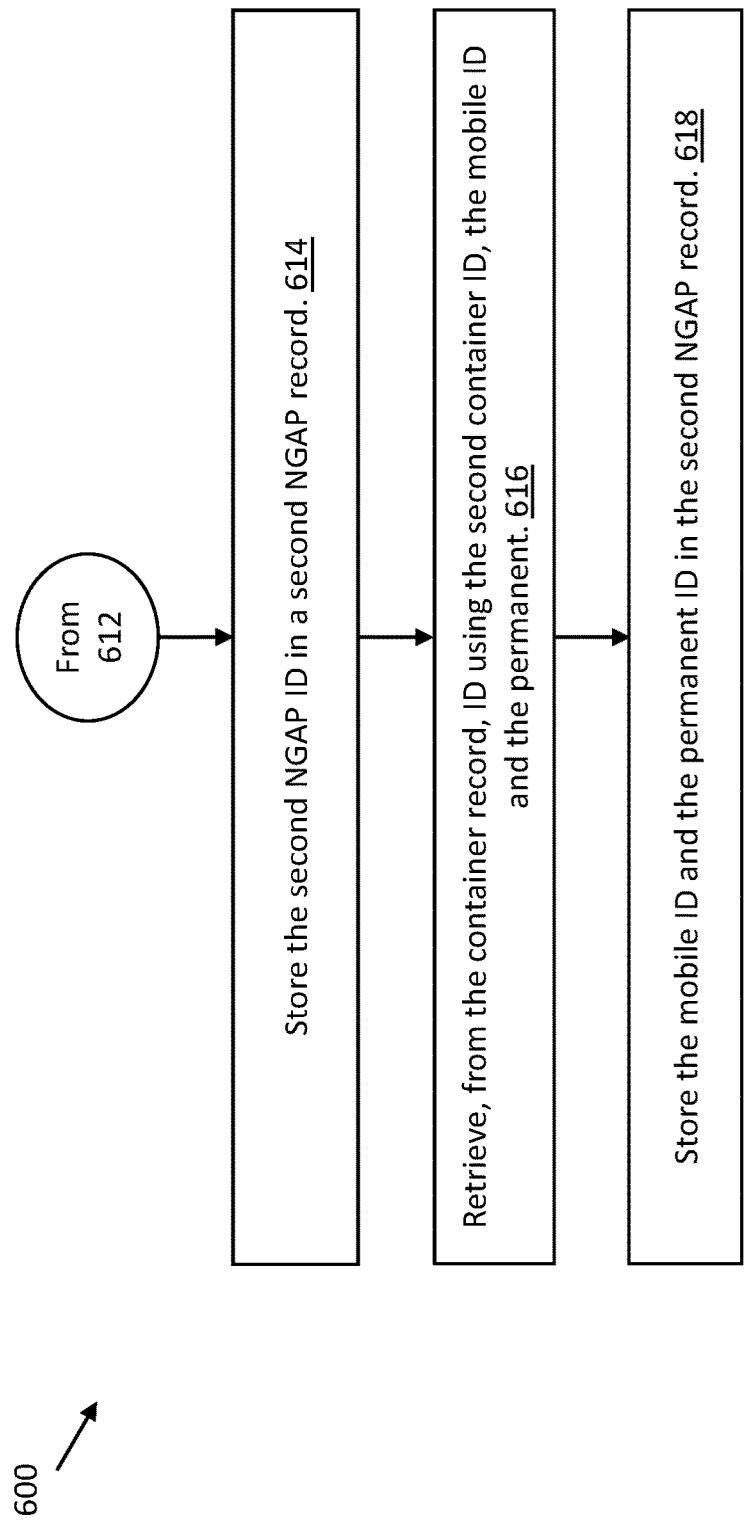

Referring now to FIGS. 6A-6B, a flow chart of an example method 600 for tracking a user during an N2 handover in which the AMF 116 is retained, is depicted, in accordance with some embodiments. The method 600 can be performed by one or more systems, components, or modules depicted in FIG. 1 or 2, including, for example, a network monitoring device 102, the processor 202, etc. In some embodiments, instructions for performing the method 600 are stored in the first storage medium 204. Additional, fewer, or different operations may be performed in the method 600 depending on the embodiment. Additionally, or alternatively, two or more of the blocks of the method 600 may be performed in parallel. Operations of the method 600 can be combined with or interchanged with operations of one or more of the method 300, the method 400, or the method 500.

Referring now to FIG. 6A, the processor 202 captures a first message transmitted over one of an N1 or an N2 interface (at operation 602). In some embodiments, the first message is a handover required message transmitted in response to the UE 106 moving to another cell (and in communication with another gNB) while retaining the AMF 116. The processor 202 extracts, from the first message, a first container ID and a first NGAP ID (at operation 604). In some embodiments, the first message includes a source to target transparent container IE which includes the first container ID.

The processor 202 retrieves an NGAP record 250 using the first NGAP ID (at operation 606). In some embodiments, the processor 202 retrieves, from the NGAP record 250, a mobile ID and a permanent ID (e.g., and a cipher key). The processor 202 stores the first container ID, the mobile ID, and the permanent ID (e.g., and the cipher key) in a container record 255 of a container data structure (at operation 608).

The processor 202 captures a second message transmitted over one of an N1 or an N2 interface (at operation 610). In some embodiments, the second message is a handover request message transmitted in response to the handover required message. The processor 202 extracts, from the second message, a second container ID and a second NGAP ID (at operation 612). In some embodiments, the second container ID matches the first container ID. In some embodiments, the processor 202 determines that the second container ID in the second message is the same as the first container ID in the first message. In some embodiments, the second NGAP ID is different from the first NGAP ID.

Referring now to FIG. 6B, the processor 202 stores the second NGAP ID in a second NGAP record (at operation 614). The processor 202 retrieves, from the NGAP record 250, using the first NGAP ID, the mobile ID and the permanent ID (e.g., and the cipher key) (at operation 616). The processor 202 stores the mobile ID and the permanent ID (e.g., and the cipher key) in the second NGAP record (at operation 618). In some embodiments, after the method 600 is completed, there are at least two NGAP records associated with the UE 106 (e.g., one for each NGAP session).

In some embodiments, the processor 202 stores the mobile ID and the permanent ID (e.g., and the cipher keys) in a user database record 265. In some embodiments, the processor 202 updates, in the user database record 265, a previous mobile ID with the mobile ID. In some embodiments, the processor 202 updates, in the user database record 265, previous cipher keys with the cipher keys.

Figure 7A:
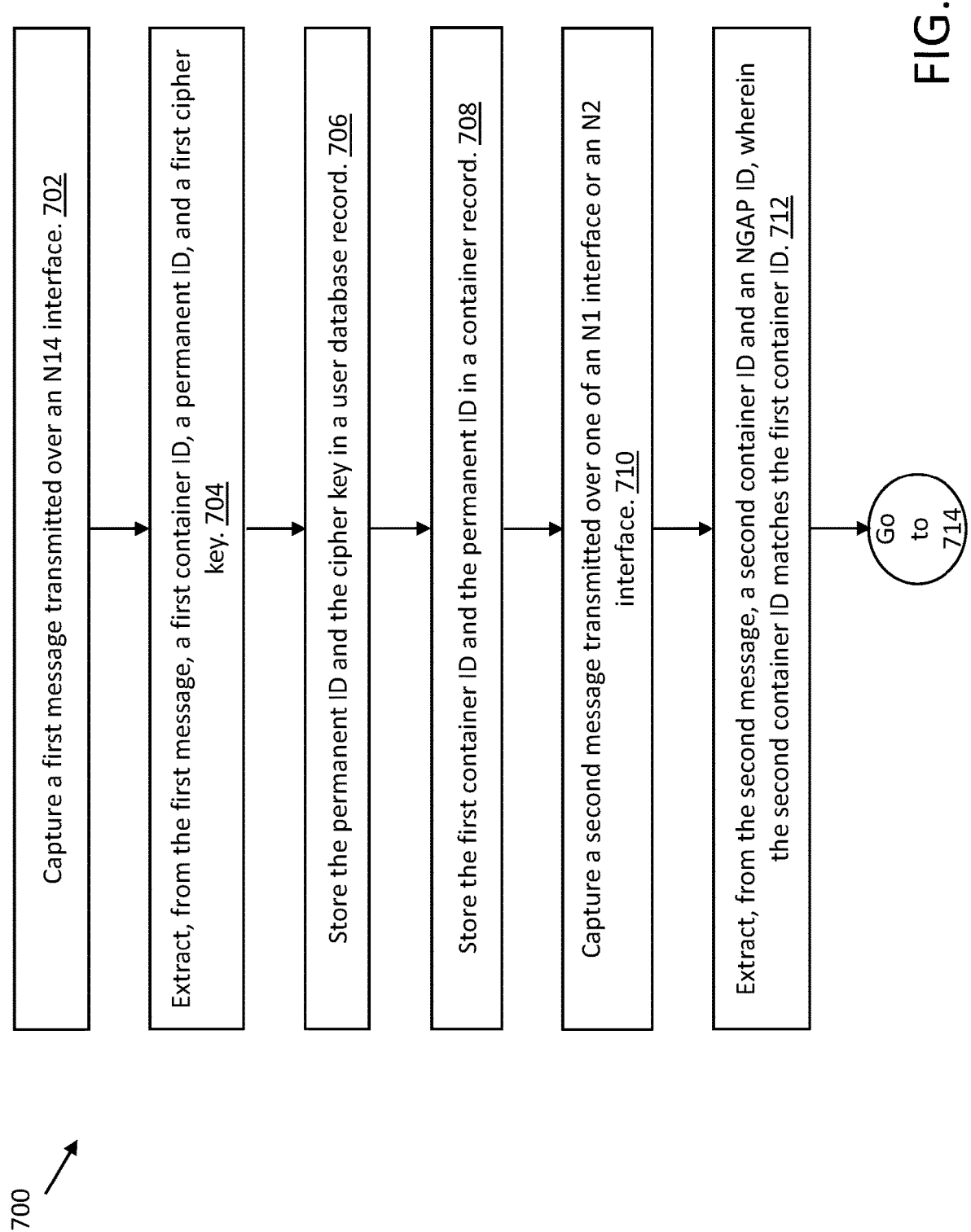
FIGS. 7A-7B are a flow chart of an example method for tracking a user during an N2 handover with an AMF change, in accordance with some embodiments.
Figure 7B:
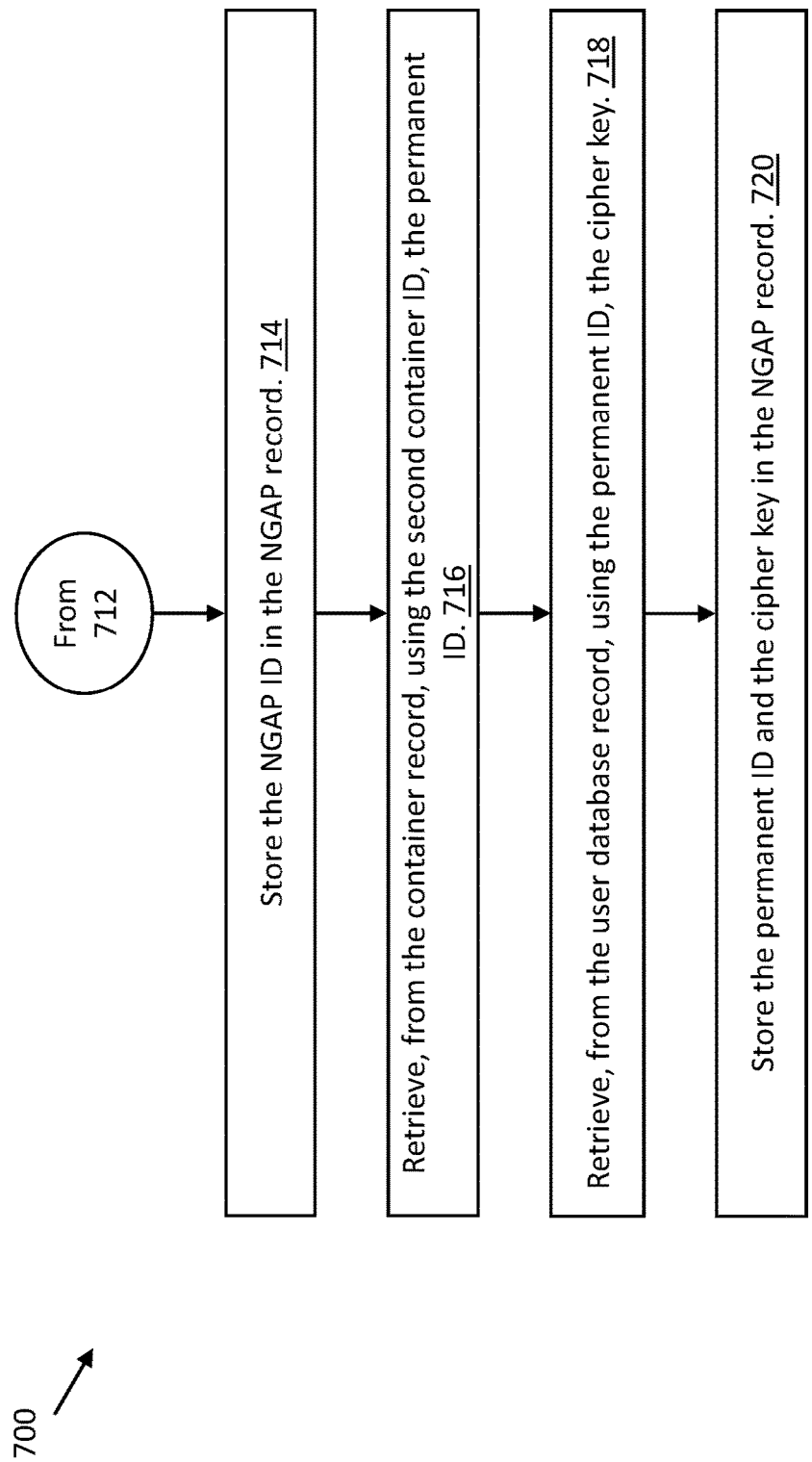

Referring now to FIGS. 7A-7B, a flow chart of an example method 700 for tracking a user during an N2 handover in which the AMF 116 is changed, is depicted, in accordance with some embodiments. The method 700 can be performed by one or more systems, components, or modules depicted in FIG. 1 or 2, including, for example, a network monitoring device 102, the processor 202, etc. In some embodiments, instructions for performing the method 700 are stored in the first storage medium 204. Additional, fewer, or different operations may be performed in the method 700 depending on the embodiment. Additionally, or alternatively, two or more of the blocks of the method 700 may be performed in parallel. Operations of the method 700 can be combined with or interchanged with operations of one or more of the methods 300-600.

Referring now to FIG. 7A, the processor 202 captures a first message transmitted over an N14 interface (at operation 702). The processor 202 extracts, from the first message a first container ID, a permanent ID, and a cipher key (at operation 704). In some embodiments, the first message includes a source to target transparent container IE which includes the first container ID. The processor 202 stores the permanent ID and the user key in a user database record 265 (at operation 706). The processor 202 stores the container ID and the permanent ID in the container record 255 (at operation 708).

The processor 202 captures a second message transmitted over one of an N1 or an N2 interface (at operation 710). In some embodiments, the second message is a handover request message. In some embodiments, the second message is transmitted in response to the first message. The processor 202 extracts, from the second message, a second container ID and an NGAP ID (at operation 712). In some embodiments, the first container ID matches the second container ID. In some embodiments, the processor 202 determines that the second container ID in the second message is the same as the first container ID in the first message.

Referring now to FIG. 7B, the processor 202 stores the NGAP ID in the NGAP record 250 (at operation 714). The processor 202 retrieves, from the container record 255, using the container ID, the permanent ID (at operation 716). The processor 202 retrieves, from the user database record 265, using the first permanent ID, the cipher key (at operation 718). The processor 202 stores the permanent ID and the cipher key in the NGAP record 250 (at operation 720). In some embodiments, after the method 700 is completed, there are at least two NGAP records associated with the UE 106 (e.g., one for each NGAP session).

Figure 8:
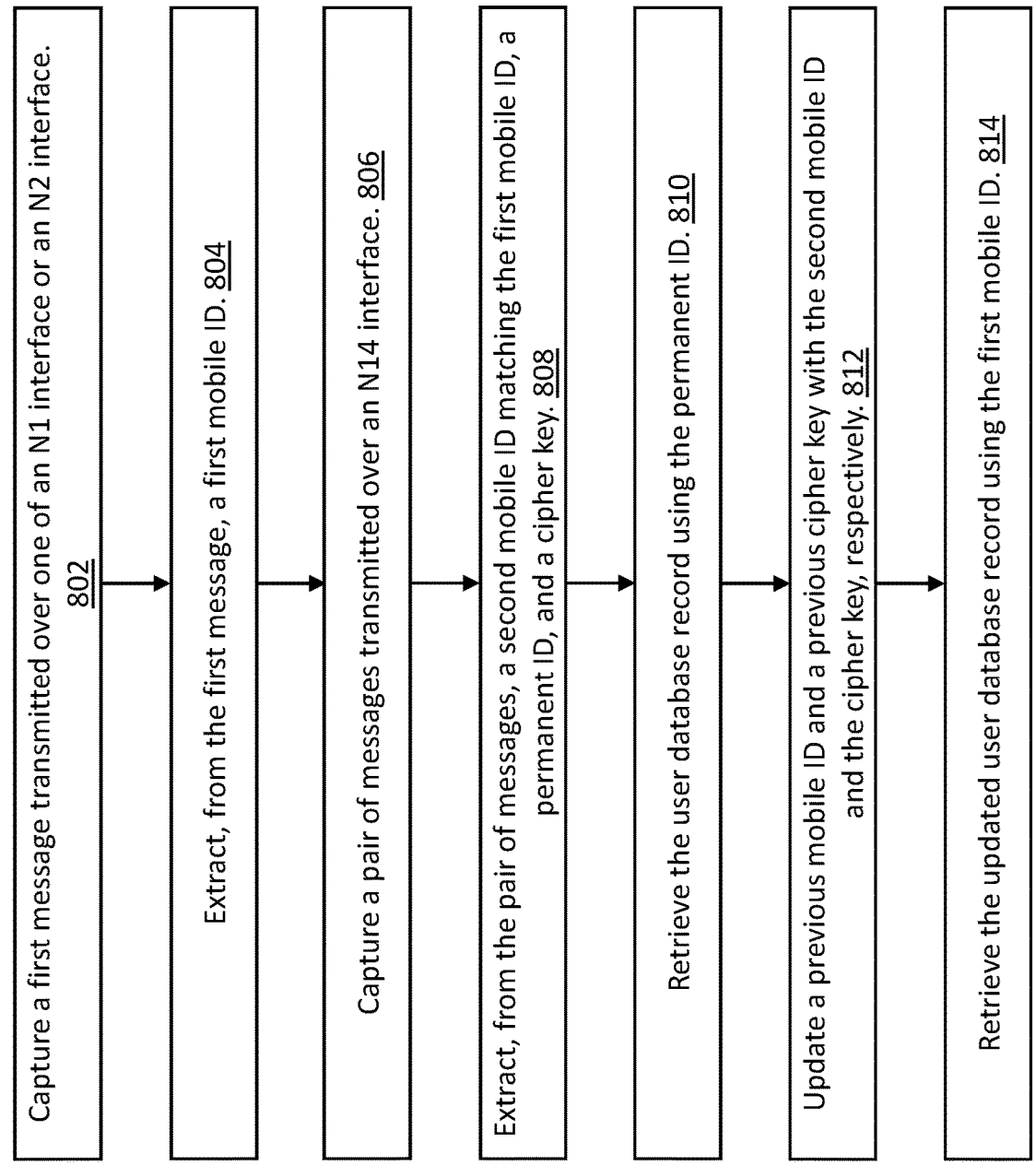
FIG. 8 is a flow chart of an example method for tracking a user during an idle N2 handover, in accordance with some embodiments.

Referring now to FIG. 8, a flow chart of an example method 800 for tracking a user during an idle N2 handover in which the AMF 116 is changed, is depicted, in accordance with some embodiments. The method 800 can be performed by one or more systems, components, or modules depicted in FIG. 1 or 2, including, for example, a network monitoring device 102, the processor 202, etc. In some embodiments, instructions for performing the method 800 are stored in the first storage medium 204. Additional, fewer, or different operations may be performed in the method 800 depending on the embodiment. Additionally, or alternatively, two or more of the blocks of the method 800 may be performed in parallel. Operations of the method 800 can be combined with or interchanged with operations of one or more of the methods 300-700.

The processor 202 captures a first message transmitted over one of an N1 interface or an N2 interface (at operation 802). In some embodiments, the first message is a registration request to a new AMF (e.g., a first one of the AMF 116 or the other AMF 128). The processor 202 extracts, from the first message, a first mobile ID (at operation 804). In some embodiments, the first mobile ID is a 5G GUTI.

The processor 202 captures a pair of messages is transmitted over one an N14 interface (at operation 806). In some embodiments, the pair of messages is transmitted in response to receiving the first message. In some embodiments, a first message of the pair of messages is a UE context transfer message sent from the new AMF to an old AMF (e.g., the other one of the AMF 116 or the other AMF 128). In some embodiments, a second message of the pair of messages is a message sent from the old AMF to the new AMF in response to the UE context transfer message. The processor 202 extracts, from the pair of messages, a second mobile ID, a permanent ID, and a cipher key (at operation 808). In some embodiments, the processor 202 extracts the second mobile ID from the first message of the pair of messages. In some embodiments, the processor 202 extracts the permanent ID and the cipher key from the second message of the pair of messages. In some embodiments, the second mobile ID matches the first mobile ID. In some embodiments, the processor 202 determines that the second mobile ID in the pair of messages is the same as the first mobile in the first message (e.g., the UE context transfer message).

The processor 202 retrieves the user database record 265 using the mobile ID (at operation 810). The processor 202 updates a previous mobile ID and a previous cipher key with the second mobile ID and the cipher key, respectively (at operation 812). In some embodiments, the second mobile ID matches the first mobile ID using the first mobile ID (at operation 814).

Figure 9A:
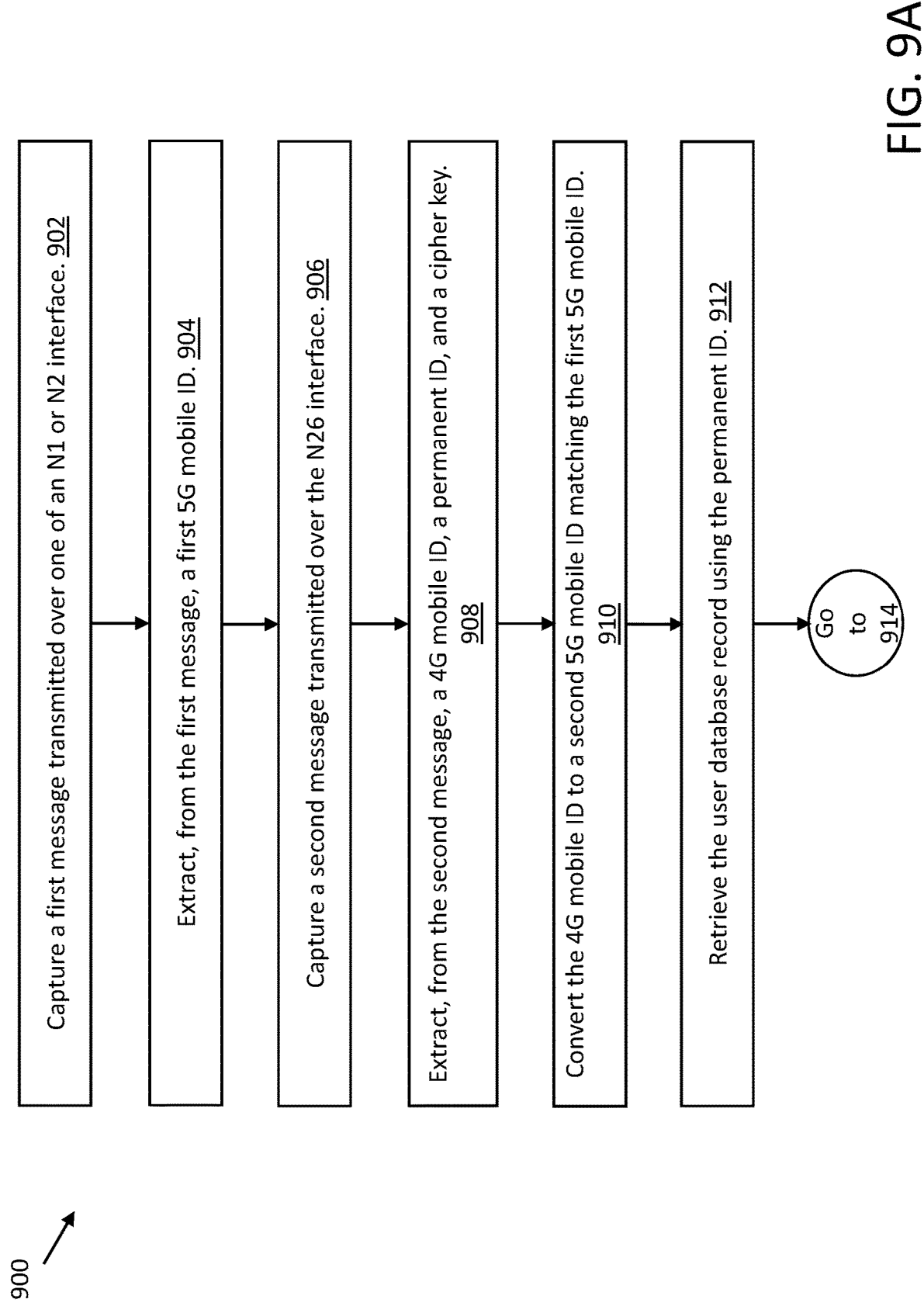
FIGS. 9A-9B are a flow chart of an example method for tracking a user during a 4G-5G handover, in accordance with some embodiments.
Figure 9B:
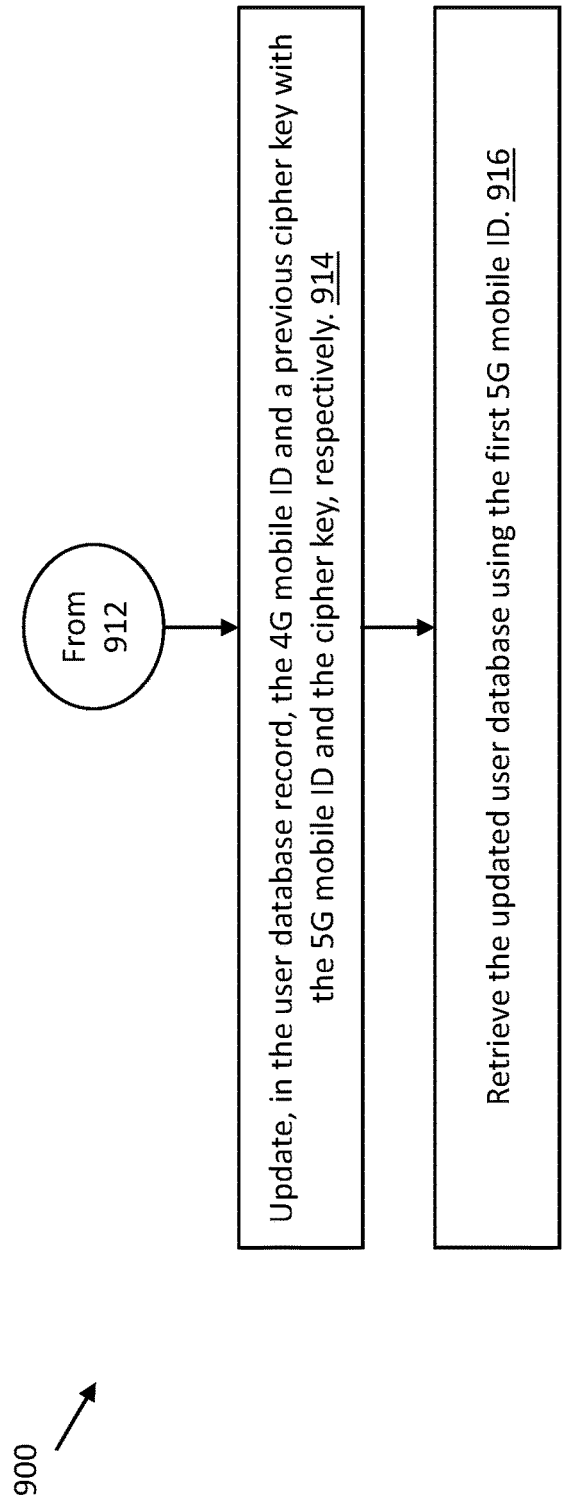

Referring now to FIGS. 9A-9B, a flow chart of an example method 900 for a user during a 4G-5G handover is depicted, in accordance with some embodiments. The method 900 can be performed by one or more systems, components, or modules depicted in FIG. 1 or 2, including, for example, a network monitoring device 102, the processor 202, etc. In some embodiments, instructions for performing the method 900 are stored in the first storage medium 204. Additional, fewer, or different operations may be performed in the method 900 depending on the embodiment. Additionally, or alternatively, two or more of the blocks of the method 900 may be performed in parallel. Operations of the method 900 can be combined with or interchanged with operations of one or more of the methods 300-800.

Referring now to FIG. 9A, the processor 202 captures a first message transmitted over one of an N1 interface or an N2 interface (at operation 902). The processor 202 extracts, from the first message, a first 5G mobile ID (at operation 904). In some embodiments, the 5G mobile ID includes a 5G GUTI. In some embodiments, the 5G mobile ID includes, maps to, or otherwise references, a 4G mobile ID. For example, the 5G GUTI includes a PLMN ID, an AMF ID, and a 5G TMSI which match or map to corresponding parts in the 4G GUTI. The corresponding parts may be in a different order in the 4G mobile ID. In some embodiments, the 5G mobile ID that references the 4G GUTI identifies a network or location of the MME 132.

The processor 202 captures a second message transmitted over the N26 interface (at operation 906). The processor 202 extracts, from the second message, the 4G mobile ID, a permanent ID, and a cipher key (at operation 908). In some embodiments, the processor 202 uses general packet radio service (GPRS) tunneling protocol (GTP) to extract the 4G mobile ID, and/or other information, from the first message (e.g., transmitted over the N26).

The processor 202 converts the 4G mobile ID to a second mobile ID matching the first mobile ID (at operation 910). In some embodiments, the processor 202 converts the 4G mobile ID by re-ordering the different parts of the 4G mobile ID so that the PLMN ID, the AMF ID, and the 5G TMSI are in a proper order for a 5G mobile ID. In some embodiments, the processor 202 converts the using a standardized algorithm that is accessible by the processor 202. In some embodiments, the processor 202 determines that the second 5G mobile ID matches the first 5G mobile ID received in the first message. The processor 202 retrieves the user database record 265 using the permanent ID (at operation 912).

Referring now to FIG. 9B, the processor 202 updates, in the user database record 265, the 4G mobile ID and a previous cipher key with the second 5G mobile ID and the cipher key, respectively (at operation 914). In some embodiments, the processor 202 updates the 4G mobile ID in other records with the 5G mobile ID. The processor 202 retrieves the updated user database record 265 using the first 5G mobile ID (at operation 916). In some embodiments, the processor 202 receives a subsequent message transmitted over one of an N1 or N2 interface and extracts a third 5G mobile ID from the third message. In some embodiments, the processor 202 retrieves the updated user database record 265 using the third 5G mobile ID extracted from the subsequent message.

Figure 10:
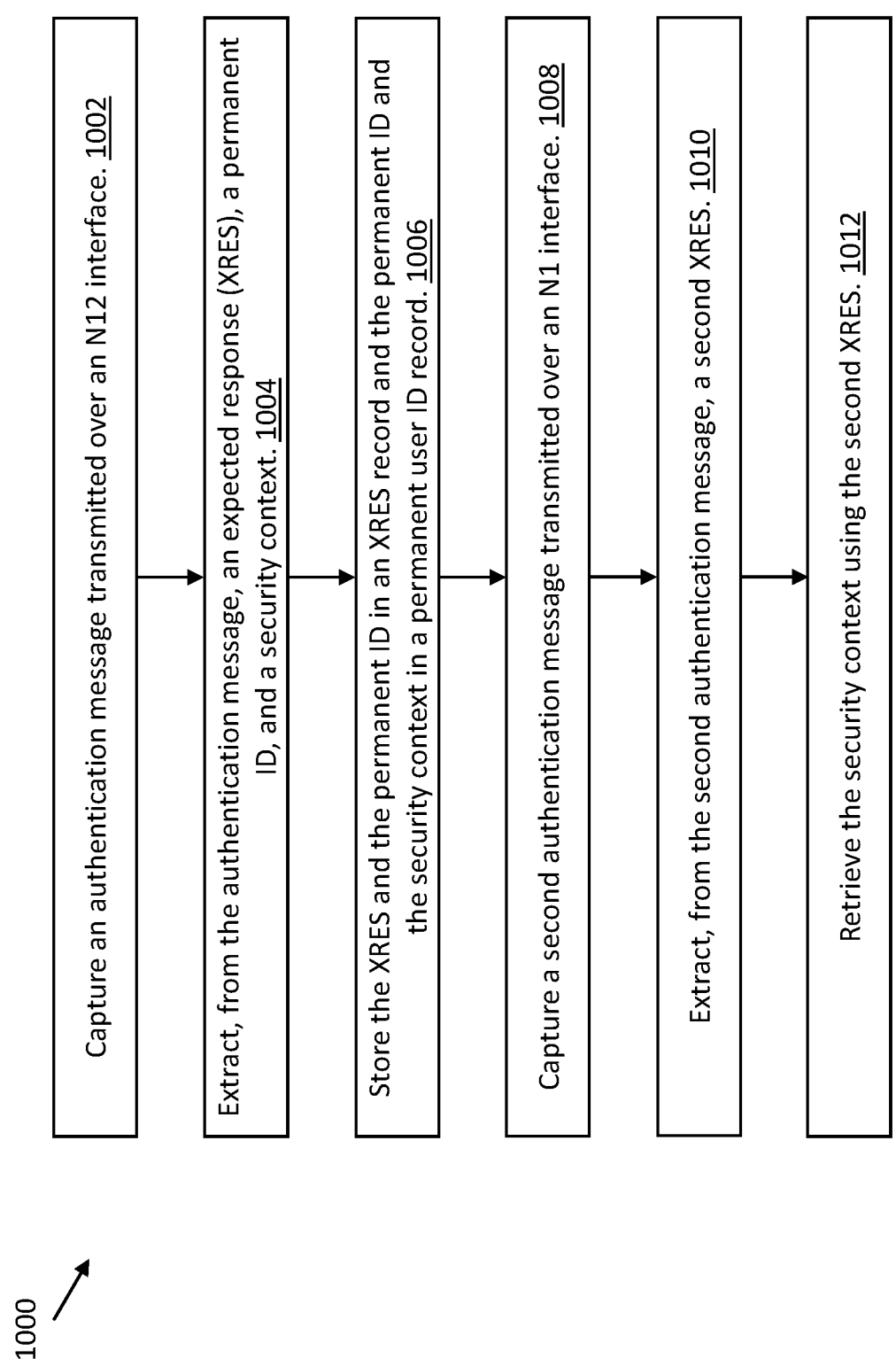
FIG. 10 is a flow chart of an example method for using a security parameter transmitted over the N12 interface to associate a user database record to an NGAP session, in accordance with some embodiments.

Referring now to FIG. 10, a flow chart of an example method 1000 for using a security parameter to associate a user database record 265 to an NGAP session is depicted, in accordance with some embodiments. The method 1000 can be performed by one or more systems, components, or modules depicted in FIG. 1 or 2, including, for example, a network monitoring device 102, the processor 202, etc. In some embodiments, instructions for performing the method 1000 are stored in the first storage medium 204. Additional, fewer, or different operations may be performed in the method 1000 depending on the embodiment. Additionally, or alternatively, two or more of the blocks of the method 1000 may be performed in parallel. Operations of the method 1000 can be combined with or interchanged with operations of one or more of the methods 300-900.

The processor 202 captures an authentication message transmitted over the N12 interface (at operation 1002). The processor 202 extracts, from the authentication message, an expected response (XRES), a permanent ID, and a security context (e.g., one or more cipher keys) (at operation 1004). The processor 202 stores the XRES and the permanent ID in an XRES record 260 and the permanent ID and the security context in the user database record 265 (at operation 1006). The processor 202 captures a second authentication message transmitted over the N1 interface (at operation 1008). The processor 202 extracts, from the second authentication message, a second XRES (at operation 1010). In some embodiments, the second XRES matches the XRES.

The processor 202 retrieves the security context using the second XRES (at operation 1012). In some embodiments, the processor 202 finds the XRES record 260 using the second XRES and the processor 202 retrieves a permanent ID from the XRES record 260. In some embodiments, the processor finds the user database record 265 using the permanent ID and retrieves the security context from the user database record 265. In some embodiments, the processor 202 deciphers a ciphered message for a user associated with the user database record 265 using the security context. Although the method 1000 was demonstrated using the XRES, other security parameters such as an authentication token (AUTN) can be used instead. While the method 1000 is performed using the XRES, the method 1000 can instead be performed using an authentication token (AUTN) or other security parameter and remain within the scope of the present disclosure.

Figure 11:
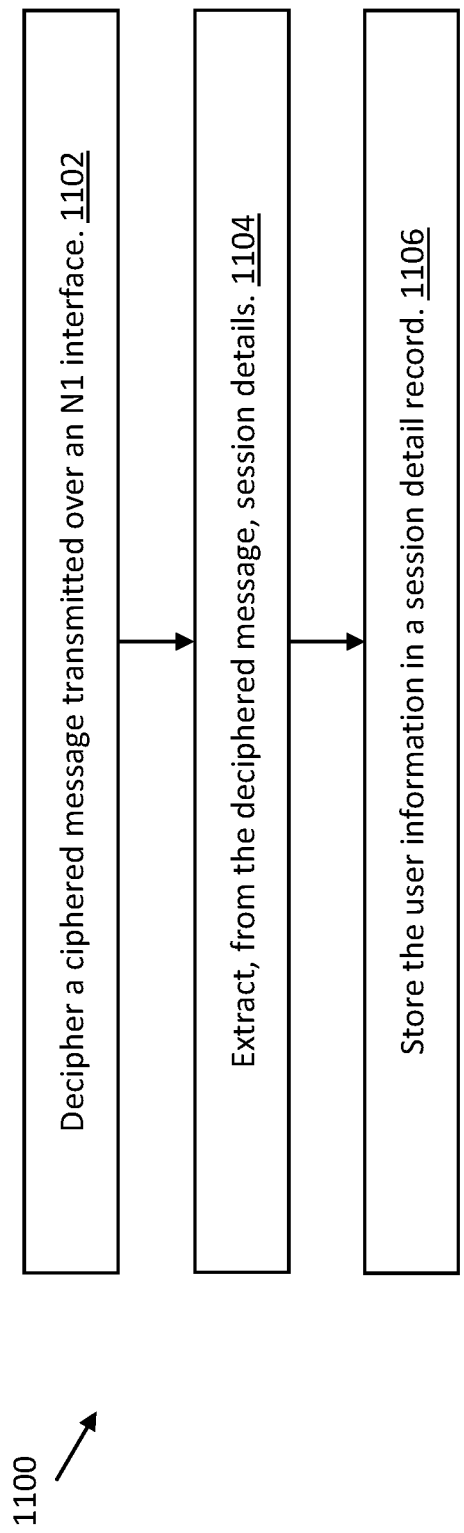
FIG. 11 is a flow chart of an example method for storing user equipment session details, in accordance with some embodiments.

Referring now to FIG. 11, a flow chart of an example method 1100 for storing user equipment session details is depicted, in accordance with some embodiments. The method 1100 can be performed by one or more systems, components, or modules depicted in FIG. 1 or 2, including, for example, a network monitoring device 102, the processor 202, etc. In some embodiments, instructions for performing the method 1100 are stored in the first storage medium 204. Additional, fewer, or different operations may be performed in the method 1100 depending on the embodiment. Additionally, or alternatively, two or more of the blocks of the method 1100 may be performed in parallel. Operations of the method 1100 can be combined with or interchanged with operations of one or more of the methods 300-1000.

The processor 202 deciphers a ciphered message transmitted over an N1 interface (at operation 1102). The processor 202 extracts, from the deciphered message, session details associated with the UE 106 (at operation 1104). The session details include, in some embodiments, one or more of location information, a handset type, local network information, service quality, a key performance indicator (KPI) or KPI key, an IMEI (e.g., or other permanent ID such as IMSI), etc. The processor 202 stores the session details in session detail record (at operation 1106), e.g., associated with the UE 106. In some embodiments, the session detail record is stored in a session detail data structure 232 in a second storage medium 206. In some embodiments, the session detail record is mapped to a user database record 265. For example, the user database record can include the IMEI and the processor 202 can retrieve an IMEI from a user database record 265 and retrieve the corresponding session detail record using the IMEI.

Figure 12:
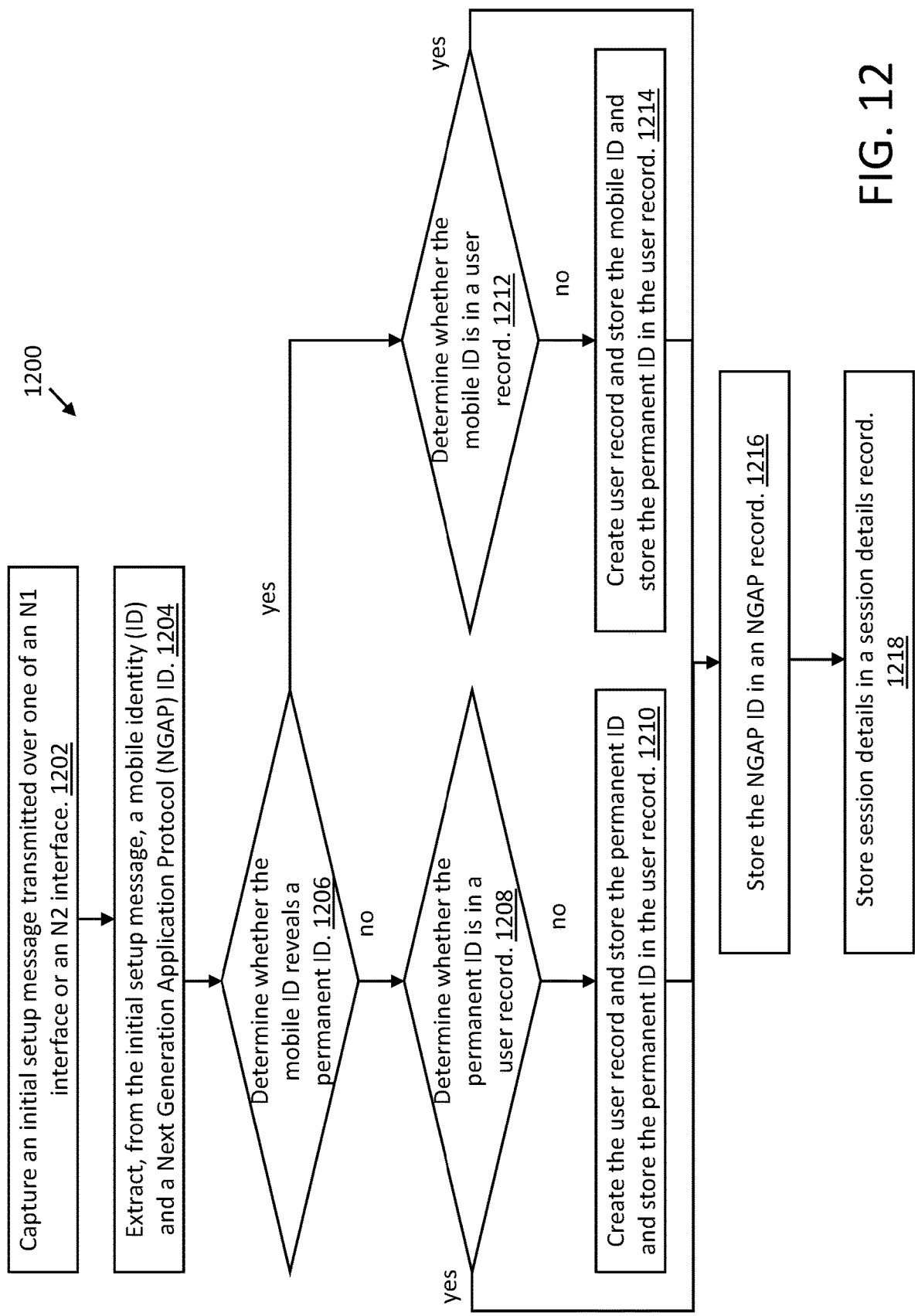
FIG. 12 is a flow chart of an example method for monitoring the 5G network, in accordance with some embodiments.

Referring now to FIG. 12, a flow chart of an example method 1200 for monitoring the 5G network 104 is depicted, in accordance with some embodiments. The method 1200 can be performed by one or more systems, components, or modules depicted in FIG. 1 or 2, including, for example, a network monitoring device 102, the processor 202, etc. In some embodiments, instructions for performing the method 1200 are stored in the first storage medium 204. Additional, fewer, or different operations may be performed in the method 1200 depending on the embodiment. Additionally, or alternatively, two or more of the blocks of the method 1200 may be performed in parallel. Operations of the method 1200 can be combined with or interchanged with operations of one or more of the methods 300-1100.

The processor 202 captures an initial setup message transmitted over one of an N1 interface or an N2 interface (at operation 1202). The processor 202 extracts, from the initial setup message, a first mobile identity (ID) and a first Next Generation application protocol (NGAP) ID (at operation 1204). In some embodiments, operations 1202 and 1204 are similar to operations 302 and 304, respectively. The processor 202 determines whether the mobile ID reveals a permanent ID (at operation 1206). In response to determining that the mobile ID does not reveal the permanent ID, the processor 202 determines whether the permanent ID is in a user database record (e.g., the user database record 265), e.g., associated with the UE 106 (at operation 1208). In response to determining that the permanent ID is not in the user database record, the processor 202 creates the user database record and stores the permanent ID and stores the permanent ID in the user database record (at operation 1210).

In response to determining that the mobile ID reveals the permanent ID, the processor 202 determines whether the mobile ID is in the user database record (at operation 1212). In some embodiments, in a scheme referred to as a null-scheme, the mobile ID (e.g., a SUCI) reveals a permanent ID (e.g., a SUPI). In response to determining that the mobile ID is not in the user database record, the processor 202 creates the user database record and stores the mobile ID and stores the mobile ID in the user database record (at operation 1214). In some embodiments, the processor 202 retrieves the user database record using one of the mobile ID or the permanent ID.

In response to determining that the mobile ID is in the user database record, in response to determining that the permanent ID is in the user database record, or in response to storing the permanent ID or the mobile ID in the user database record, the processor 202 stores the NGAP ID in an NGAP record (at operation 1216). In some embodiments, the processor 202 stores the mobile ID in the NGAP record so that the NGAP record maps to the user database record. In some embodiments, operation 1216 is similar to operation 306. In some embodiments, operations 1202-1216 maps, or otherwise associates, the user database record to an NGAP session associated with the NGAP ID.

In some embodiments, the processor 202 captures another message which is transmitted over an N1 interface. In some embodiments, the processor 202 extracts from the other message, user equipment session details, similarly to operation 1104. In some embodiments, the processor 202 stores the session details in a session detail record (operation 1218). In some embodiments, the operation 1218 is similar to the operation 1106.

Figure 13:
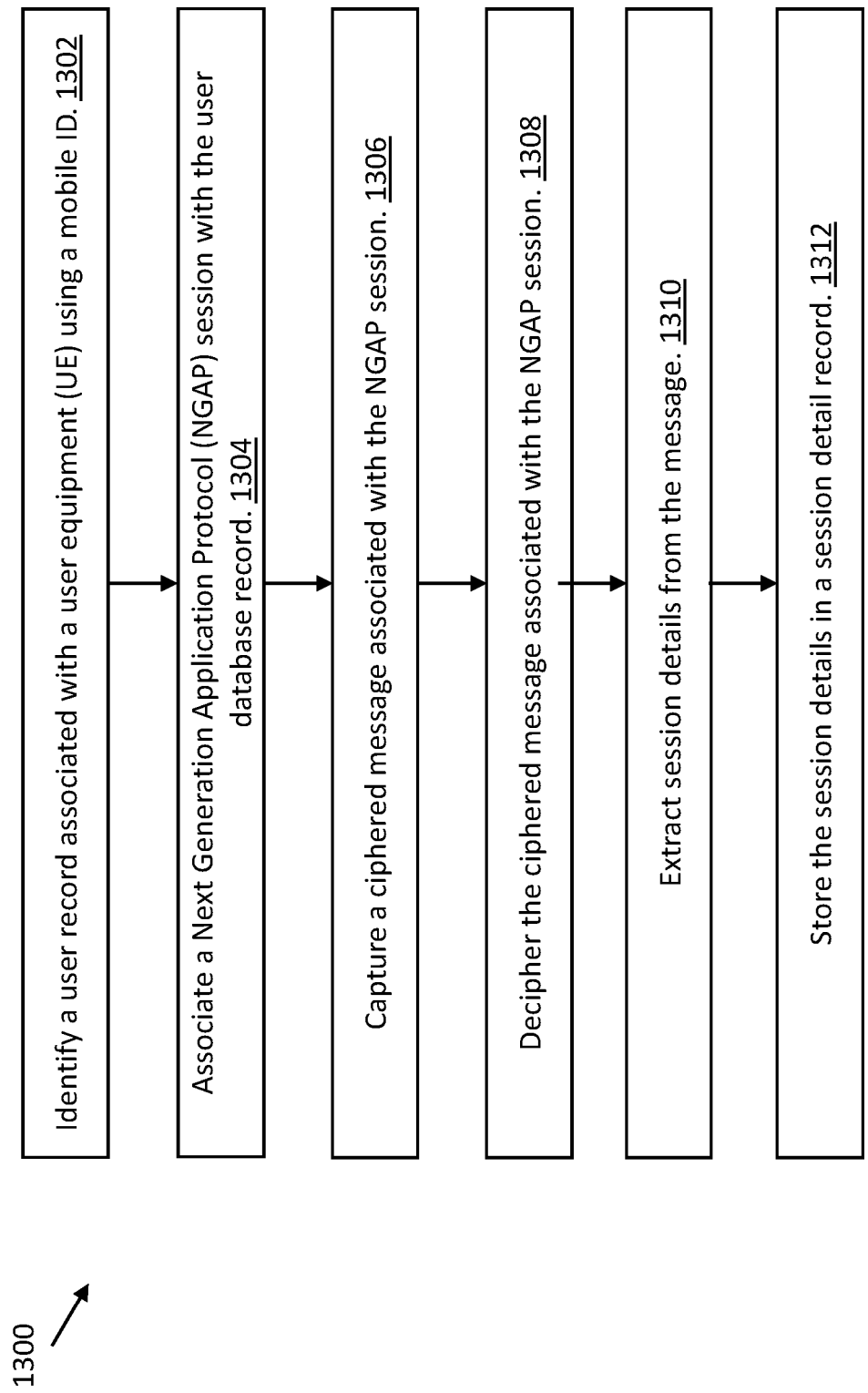
FIG. 13 is a flow chart of an example method for monitoring the 5G network, in accordance with some embodiments.

Referring now to FIG. 13, a flow chart of an example method 1300 for monitoring the 5G network 104 is depicted, in accordance with some embodiments. The method 1300 can be performed by one or more systems, components, or modules depicted in FIG. 1 or 2, including, for example, a network monitoring device 102, the processor 202, etc. In some embodiments, instructions for performing the method 1300 are stored in the first storage medium 204. Additional, fewer, or different operations may be performed in the method 1300 depending on the embodiment. Additionally, or alternatively, two or more of the blocks of the method 1300 may be performed in parallel. Operations of the method 1300 can be combined with or interchanged with operations of one or more of the methods 300-1200.

The processor 202 identifies a user database record associated with a user equipment (UE) using a mobile ID (at operation 1302). In some embodiments, the processor 202 captures a first message transmitted over one of an N1 interface and an N2 interface. In some embodiments, the processor 202 extracts the mobile identity (ID) from the first message. In some embodiments, the first message is an initial setup/registration message. In some embodiments, the mobile ID includes one of a temporary mobile subscriber identity (TMSI), a shorten (S)-TMSI, a 5G-S-TMSI, a globally unique temporary ID (GUTI), or a 5G-GUTI. In some embodiments, the mobile ID is a 4G mobile ID and the processor 202 captures a second message transmitted over the N26 interface, extracts, from the second message, a 5G mobile ID, and updates the 4G mobile ID with the 5G mobile ID. In some embodiments, the processor 202 performs the method 900.

The processor 202 associates a Next Generation application protocol (NGAP) session with the user database record (at operation 1304). In some embodiments, the processor 202 captures a third message transmitted over one of an N1 interface and an N2 interface. In some embodiments, the processor 202 extracts one of an NGAP ID or a security parameter (e.g. an expected response (XRES) or an authentication token (AUTN)) from the third message. In some embodiments, the third message is an initial setup/registration message (e.g., a same message as the first message) including the NGAP ID, while in other embodiments, the third message is an authentication message including the security parameter. In some embodiments, the processor 202 associates the NGAP session with the user database record using the one of the NGAP ID or the security parameter. In some embodiments, the processor 202 stores the NGAP ID in the NGAP record. In some embodiments, the processor 202 performs operations 302-308 and/or the method 1000.

In some embodiments, the processor 202 captures a fourth message transmitted over the N2 interface, extracts a second NGAP ID and a second mobile ID from the fourth message, retrieves the user database record using the NGAP ID, and updates the mobile ID with the second mobile ID. In some embodiments, the processor 202 performs operations 402 to 410.

In some embodiments, the processor 202 captures a fifth message and a sixth message transmitted over one or more of the N1 interface, the N2 interface, N14 interface, or N26 interface that indicates a handover. In some embodiments, the processor 202 extracts appropriate parameters, retrieves appropriate records, and updates appropriate parameters with some of the extracted parameters. In some embodiments, the processor 202 performs one of the methods 500-900.

The processor 202 captures a ciphered message associated with the NGAP session (at operation 1306). The processor 202 deciphers the ciphered message associated with the NGAP session (at operation 1308). The processor 202 extracts session details associated with the UE 106 from the deciphered message (at operation 1310). The processor 202 stores the session details in a session detail record (at operation 1312). In some embodiments, the user database record and the NGAP record are stored in a centralized database (e.g., the correlation data structure 230 in the first storage medium 204) and the session detail record is stored in a distributed database (e.g., the second storage medium 206). In some embodiments, the session details include metadata. In some embodiments, the session details include one or more (e.g., two or more) of location information, a handset type, local network information, service quality information, or a key performance indicator (KPI). In some embodiments, the processor 202 performs the method 1100.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. A non-transitory computer readable medium comprising instructions for providing a mobile user monitoring solution that, when executed by a processor, cause the processor to:
   identify a user database record associated with a user equipment (UE) using a mobile identity (ID);
   associate a Next Generation application protocol (NGAP) session with the user database record using an NGAP ID;
   capture a ciphered message associated with the NGAP session;
   decipher the ciphered message associated with the NGAP session;
   extract, from the deciphered message, session details associated with the UE; and
   store the session details in a session detail record.

2. The medium of claim 1, wherein the user database record includes a permanent ID, wherein the mobile ID includes one of a temporary mobile subscriber identity (TMSI), a shorten (S)-TMSI, a 5G-S-TMSI, a globally unique temporary ID (GUTI), or a 5G-GUTI, wherein the permanent ID includes a subscription permanent identity (SUPI), and wherein the SUPI contains one of an international mobile subscriber identity (IMSI) or a network access identifier (NAI).

3. The medium of claim 1, comprising instructions that, when executed by a processor, further cause the processor to identify the user database record by:
   capturing a first message transmitted over one of an N1 interface and an N2 interface;
   extracting the mobile ID from the first message; and
   identifying the user database record using the mobile ID.

4. The medium of claim 3, comprising instructions that, when executed by a processor, further cause the processor to decipher the ciphered message associated with the NGAP session by:
   retrieving, from the user database record, a cipher key using the mobile ID; and
   deciphering, using the cipher key, the ciphered message associated with the NGAP session.

5. The medium of claim 1, comprising instructions that, when executed by a processor, further cause the processor to associate the NGAP session with the user database record by:
   capturing a first message transmitted over one of an N1 interface or an N2 interface;
   extracting, from the first message, one of the NGAP ID, an expected response (XRES), or an authentication token (AUTN); and
   associating the NGAP session with the user database record using the one of the NGAP ID, the XRES, or the AUTN.

6. The medium of claim 5, comprising instructions that, when executed by a processor, further cause the processor to associate the NGAP session with the user database record by:
- capturing a second message transmitted over an N12 interface;
- extracting, from the second message, one of the XRES or the AUTN, a permanent ID, and a cipher key;
- storing the one of the XRES or the AUTN and the permanent ID in an XRES record;
- storing the permanent ID and the cipher key in the user database record;
- extracting, from the first message, the one of the XRES or the AUTN;
- retrieving the permanent ID from the XRES record using the one of the XRES or the AUTN; and
- retrieving the cipher key from the user database record using the permanent ID.

7. The medium of claim 1, comprising instructions that, when executed by a processor, further cause the processor to:
- capture a first message transmitted over an N2 interface;
- extract, from the first message, the NGAP ID and a second mobile ID;
- retrieve the mobile ID from an NGAP record using the NGAP ID;
- retrieve the user database record using the mobile ID; and
- update the mobile ID with the second mobile ID.

8. The medium of claim 1, comprising instructions that, when executed by a processor, further cause the processor to:
- capture a first message transmitted over one of an N1 interface or an N2 interface;
- extract, from the first message, the NGAP ID, wherein the NGAP ID is stored in an NGAP record;
- capture a second message transmitted over the one of the N1 interface or the N2 interface;
- extract, from the second message, a second NGAP ID;
- store the second NGAP ID in a second NGAP record;
- retrieve, from the NGAP record, using the NGAP ID, the mobile ID and a permanent ID; and
- store the mobile ID and the permanent ID in the second NGAP record.

9. The medium of claim 1, comprising instructions that, when executed by a processor, further cause the processor to:
- capture a first message transmitted over an N1 interface or an N2 interface;
- extract, from the first message, a first container ID and the NGAP ID;
- retrieve an NGAP record using the NGAP ID;
- store the first container ID, the mobile ID, and a permanent ID in a container record;
- capture a second message transmitted over the one of the N1 interface or the N2 interface;
- extract, from the second message, a second container ID and a second NGAP ID, wherein the second container ID matches the first container ID;
- store the second NGAP ID in a second NGAP record;
- retrieve, from the container record, using the second container ID, the mobile ID and the permanent ID; and
- store the mobile ID and the permanent ID in the second NGAP record.

10. The medium of claim 1, comprising instructions that, when executed by a processor, further cause the processor to:
- capture a first message transmitted over an N14 interface;
- extract, from the first message, a first container ID, a permanent ID, and a cipher key;
- store the permanent ID and the cipher key in the user database record;
- store the first container ID and the permanent ID in a container record;
- capture a second message transmitted over one of an N1 interface or an N2 interface;
- extract, from the second message, a second container ID and the NGAP ID, wherein the second container ID matches the first container ID;
- store the NGAP ID in the NGAP record;
- retrieve, from the container record, using the second container ID, the permanent ID;
- retrieve, from the user database record, using the permanent ID, the cipher key; and
- store the permanent ID and the cipher key in the NGAP record.

11. The medium of claim 1, comprising instructions that, when executed by a processor, further cause the processor to:
- capture a first message transmitted over one of an N1 interface or an N2 interface;
- extract, from the first message, the mobile ID;
- capture a pair of messages transmitted over an N14 interface;
- extract, from the pair of messages, a second mobile ID matching the mobile ID, a permanent ID, and a cipher key;
- retrieve the user database record using the permanent ID;
- update, in the user database record, a previous mobile ID and a previous cipher key with the mobile ID and the cipher key, respectively; and
- retrieve the updated user database record using the mobile ID.

12. The medium of claim 1, comprising instructions that, when executed by a processor, further cause the processor to:
- capture a first message transmitted over one of an N1 interface and an N2 interface;
- extract, from the first message, a first 5G mobile ID;
- capture a second message transmitted over an N26 interface;
- extract, from the second message, a 4G mobile ID, a permanent ID, and a cipher key;
- convert the 4G mobile ID to a second 5G mobile ID matching the first 5G mobile ID;
- retrieve the user database record using the permanent ID;
- update, in the user database record, the 4G mobile ID and a previous cipher key with the second 5G mobile ID and the cipher key, respectively; and
- retrieve the updated user database record using the first 5G mobile ID.

13. The medium of claim 1, wherein the session details include two or more of location information, a handset type, local network information, service quality information, or other user statistics.

14. An apparatus comprising a processor and a memory, wherein the memory includes programmed instructions that, when executed by the processor, cause the apparatus to:
- identify a user database record associated with a user equipment (UE) using a mobile identity (ID);
- associate a Next Generation application protocol (NGAP) session with the user database record using an NGAP ID;
- capture a ciphered message associated with the NGAP session;

decipher the ciphered message associated with the NGAP session;

extract, from the deciphered message, session details associated with the UE; and store the session details in a session detail record.

15. The apparatus of claim 14, wherein the user database record includes a permanent ID, wherein the mobile ID includes one of a temporary mobile subscriber identity (TMSI), a shorten (S)-TMSI, a 5G-S-TMSI, a globally unique temporary ID (GUTI), or a 5G-GUTI, wherein the permanent ID includes a subscription permanent identity (SUPI), and wherein the SUPI contains one of an international mobile subscriber identity (IMSI) or a network access identifier (NAI).

16. The apparatus of claim 14, wherein the memory includes programmed instructions that, when executed by a processor, further cause the apparatus to identify the user database record by:

capturing a first message transmitted over one of an N1 interface and an N2 interface;

extracting the mobile ID from the first message; and identifying the user database record using the mobile ID.

17. The apparatus of claim 14, wherein the memory includes programmed instructions that, when executed by a processor, further cause the apparatus to associate the NGAP session with the user database record by:

capturing a first message transmitted over one of an N1 interface or an N2 interface;

extracting, from the first message, one of the NGAP ID, an expected response (XRES), or an authentication token (AUTN); and associating the NGAP session with the user database record using the one of the NGAP ID, the XRES, or the AUTN.

18. A method comprising:

identifying a user database record associated with a user equipment (UE) using a mobile identity (ID);

associating a Next Generation application protocol (NGAP) session with the user database record using an NGAP ID;

capturing a ciphered message associated with the NGAP session;

deciphering the ciphered message associated with the NGAP session;

extracting, from the deciphered message, session details associated with the UE; and storing the session details in a session detail record.

19. The method of claim 18, wherein identifying the user database record further comprises:

capturing a first message transmitted over one of an N1 interface and an N2 interface;

extracting the mobile ID from the first message; and identifying the user database record using the mobile ID.

20. The method of claim 18, wherein associating the NGAP session with the user database record further comprises:

capturing a first message transmitted over one of an N1 interface or an N2 interface;

extracting, from the first message, one of the NGAP ID, an expected response (XRES), or an authentication token (AUTN); and associating the NGAP session with the user database record using the one of the NGAP ID, the XRES, or the AUTN.

* * * * *